TOOL RADIUS CORRECTION COMPUTER

Filed Sept. 6, 1956 12 Sheets-Sheet 1

ROBERT W. TRIPP
*INVENTOR.*

*BY* W. E. Beatty

*ATTORNEY.*

Sept. 8, 1964 R. W. TRIPP 3,148,317

TOOL RADIUS CORRECTION COMPUTER

Filed Sept. 6, 1956 12 Sheets-Sheet 2

ROBERT W. TRIPP,
*INVENTOR.*

BY W E Beatty

*ATTORNEY.*

ROBERT W. TRIPP,
*INVENTOR.*
BY W E Beatty
*ATTORNEY.*

ROBERT W. TRIPP,
*INVENTOR.*

*BY* W E Beatty

*ATTORNEY.*

ROBERT W. TRIPP,
*INVENTOR.*

BY W E Beatty

*ATTORNEY.*

ROBERT W. TRIPP,
INVENTOR.
BY W. E. Beatty
ATTORNEY.

Sept. 8, 1964 R. W. TRIPP 3,148,317

TOOL RADIUS CORRECTION COMPUTER

Filed Sept. 6, 1956 12 Sheets-Sheet 7

ROBERT W. TRIPP,
*INVENTOR.*

BY W E Beatty

*ATTORNEY.*

ROBERT W. TRIPP,
INVENTOR.

BY W E Beatty

ATTORNEY.

ROBERT W. TRIPP,
*INVENTOR.*

BY W. E. Beatty

*ATTORNEY.*

ROBERT W. TRIPP,
INVENTOR.

BY W E Beatty
ATTORNEY.

ROBERT W. TRIPP,
INVENTOR.
BY W. E. Beatty
ATTORNEY.

Sept. 8, 1964 R. W. TRIPP 3,148,317

TOOL RADIUS CORRECTION COMPUTER

Filed Sept. 6, 1956 12 Sheets-Sheet 12

ROBERT W. TRIPP,
INVENTOR.

BY W E Beatty
ATTORNEY.

3,148,317

TOOL RADIUS CORRECTION COMPUTER

Robert W. Tripp, Bronxville, N.Y., assignor, by mesne assignments, to Inductosyn Corporation, Carson City, Nev., a corporation of Nevada Filed Sept. 6, 1956, Ser. No. 608,357
20 Claims. (Cl. 318—28)

This invention relates to two or three dimensional tool radius correction computers and more particularly to the control of machine tools in which the rotating cutter of finite radius and a workpiece are moved relatively to each other according to a program of two or three dimensional information supplied to the traversing drives of the workpiece carriage or cutting head in the machine tool in order to generate on the workpiece a surface or profile of specified shape.

Patent 2,843,811, issued July 15, 1958, in applicant's name, discloses and claims a three dimensional machine control servosystem. This system provides a continuous machining operation, a data input device supplying signals representing selected coordinates along the curve to be cut. A computer accepts the input data and converts it into rate drive commands for the machine drives. The machine parts move along their separate axes simultaneously at continuously changing rates and the required curve is cut in the workpiece. The system is an analog type of system and it operates with great accuracy, particularly as the instructions transmitted to and received by the machine drives are in a plurality of grades of increments, one of which is a fine grade for which the highly accurate Inductosyn [1] (Pat. No. 2,799,835) is provided.

The present application is a continuation-in-part of copending application S.N. 561,769, filed January 27, 1956, for "Tool Radius Correction Computer System," now abandoned. The present invention includes a tool radius computer which provides a basic or recorded program in terms of the two dimensional contour of the desired workpiece to the exclusion of a correction for the tool radius, with a separate tool radius control. This avoids the very laborious digital computation required according to prior practice, if the cutter radius is changed, for the reason that while the basic or recorded program heretofore took into account a correction for the tool radius, it did so by making an allowance for the tool radius an integral part of the basic program, requiring that such basic program be changed if the tool radius is changed.

The present invention also includes a two dimensional tool radius computer which programs and deals with signals representing the angle $\theta$ between the tool path in the X, Y plane and the X axis.

According to the present invention, the basic, i.e., the recorded program is in terms of both the two and three dimensional contour of the desired part to the exclusion of a correction for the tool radius. This basic program is then converted by an analog computer provided by the invention, into a program of cutter center locations for the machine tool, the cutter radius being inserted separately, either manually or automatically into the computer. The computer thus derives from the program of the desired surface the corrections to that program necessary to provide the machine tool with a program of cutter center locations for it to follow.

The invention greatly reduces the amount of digital computation which must be performed in the initial programming of the part to be cut despite the necessity thereby involved, as will be presently explained, of programming not only the desired finished surface but also the angle $\theta$ between the tool path component in X, Y plane and the X axis, and the angle $\phi$ that the tool path extends

[1] Trademark.

out of that plane, in terms of the program for the desired finished surface.

As in S.N. 561,769, now abandoned, another important advantage of the invention is the facility with which the cutter size may be changed, without recomputation of the basic program. A change from positive to negative in the cutter radius input to the computer results in transfer of the cutter motion from one to the opposite sides of the profile specified by the basic program information. In this way matching male and female parts can be cut from the same program. By using in the computer a cutter radius setting slightly different from that of the cutter actually employed, the machine tool can be caused to cut the workpiece a corresponding amount larger or smaller than is called for by the program of the workpiece itself. Thus mating parts can be cut with a predetermined space between them, as is useful in the production of stamping dies. Roughing cuts can also be made by this method, followed by a finishing cut made with a different sized cutter or with the same cutter upon proper adjustment of the cutter radius setting in the computer of the invention.

For further details of the invention, reference may be made to the drawings wherein FIG. 1 is a schematic diagram of various kinds of input data characteristic of a tool path, and feed rate input data, for a digital-to-analog converter for converting such data to analog values of the angle $\theta$ representing the angle of the component of the tool path in the X, Y plane as indicated in FIG. 10.

Figure 4:
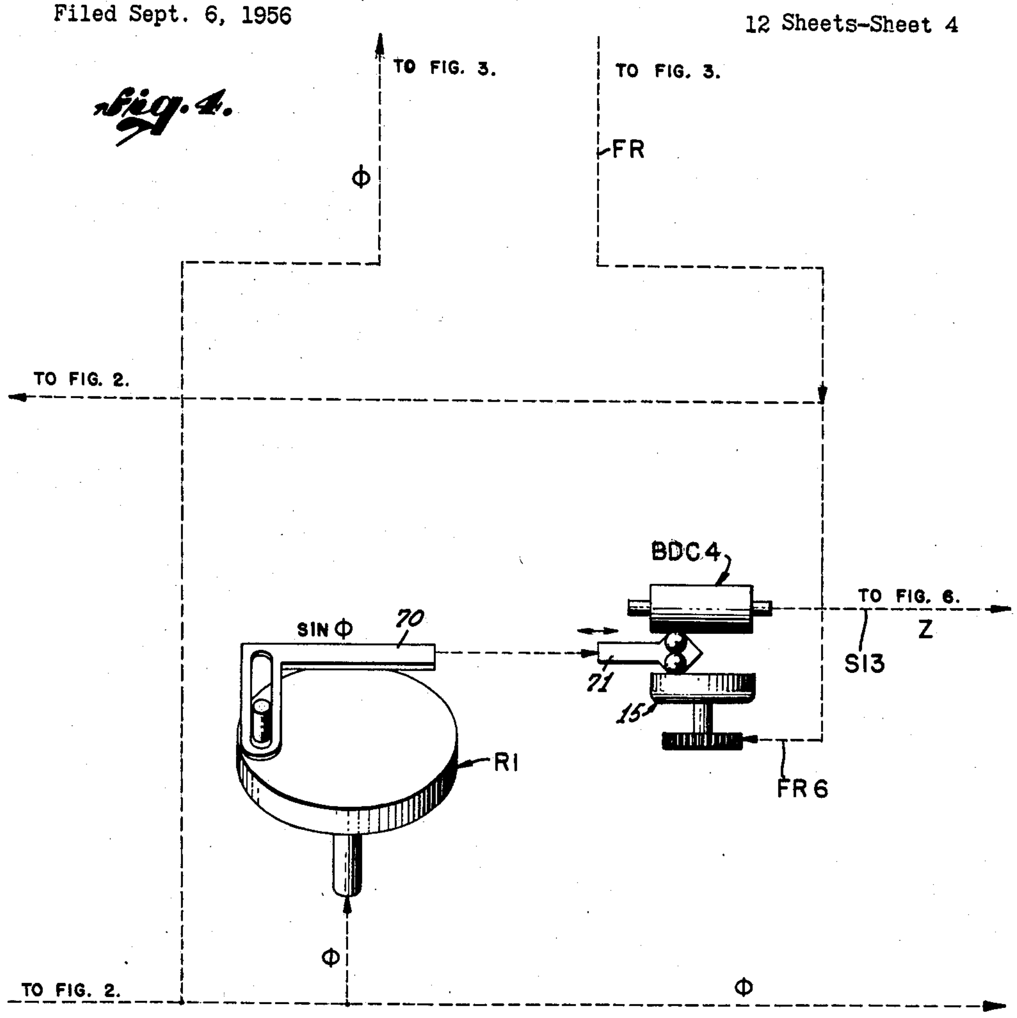

FIG. 4 schematically illustrates a resolver having an input $\phi$ and a feed rate integrator therefor.

Figure 1:
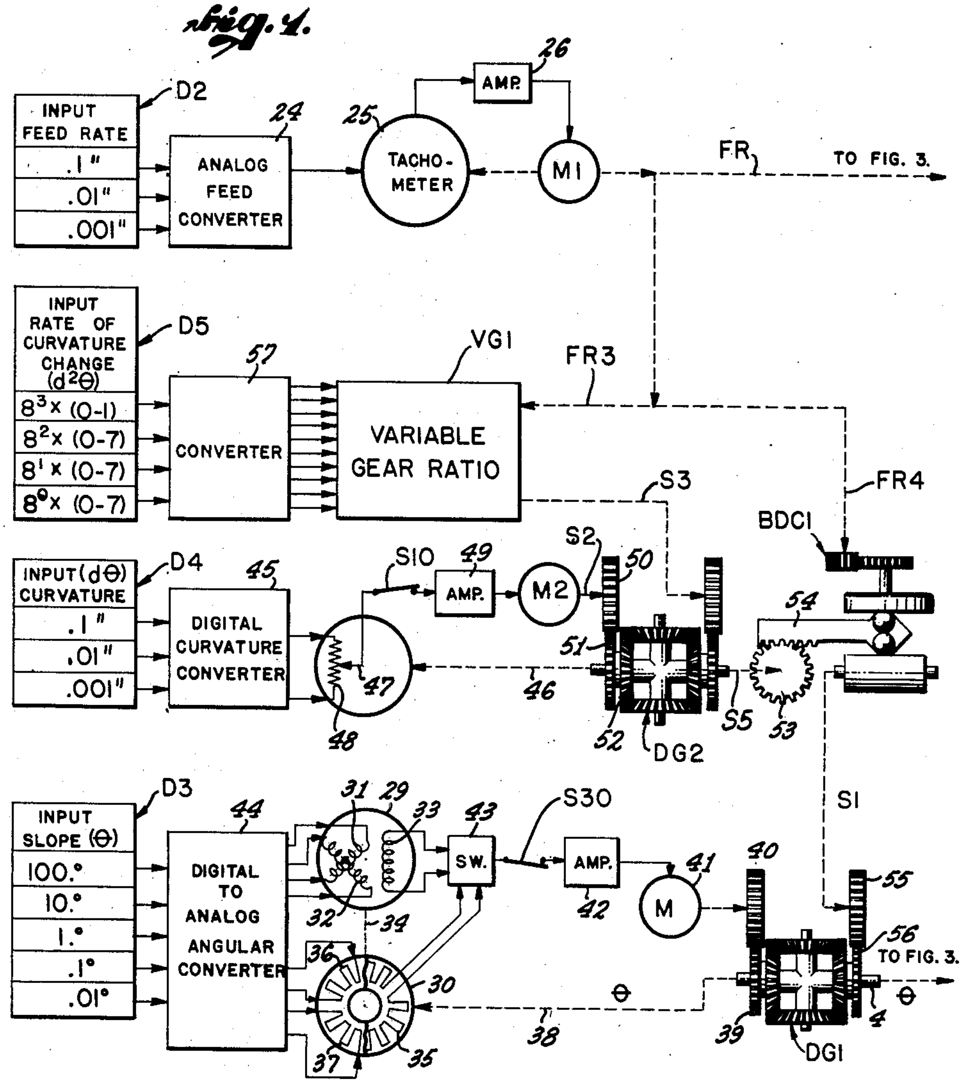
Figure 2:
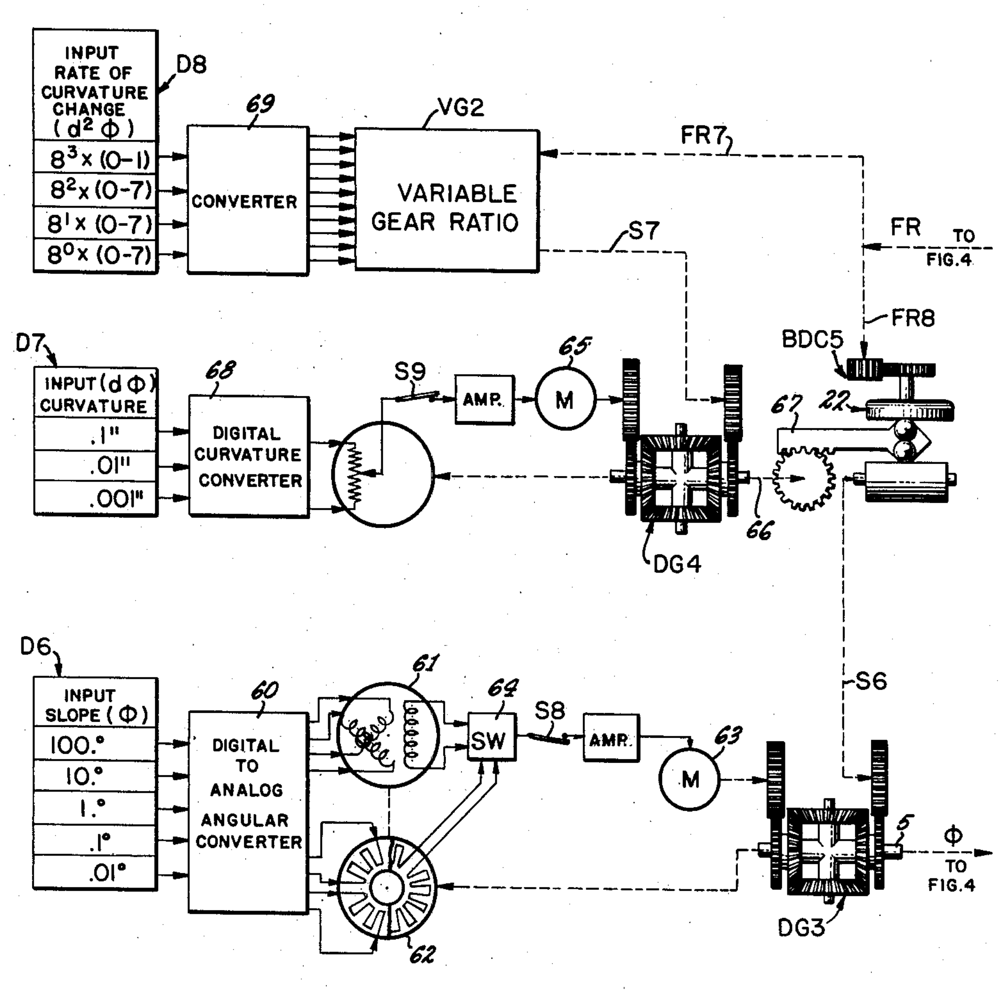
FIG. 2 is a similar schematic diagram of input data characteristic of the tool path and a digital-to-analog converter providing analog values of the angle $\phi$ representing the angle of the tool path above the X, Y plane, that is in a plane containing the tool path and the Z axis at right angles to the X, Y plane.
Figure 5:
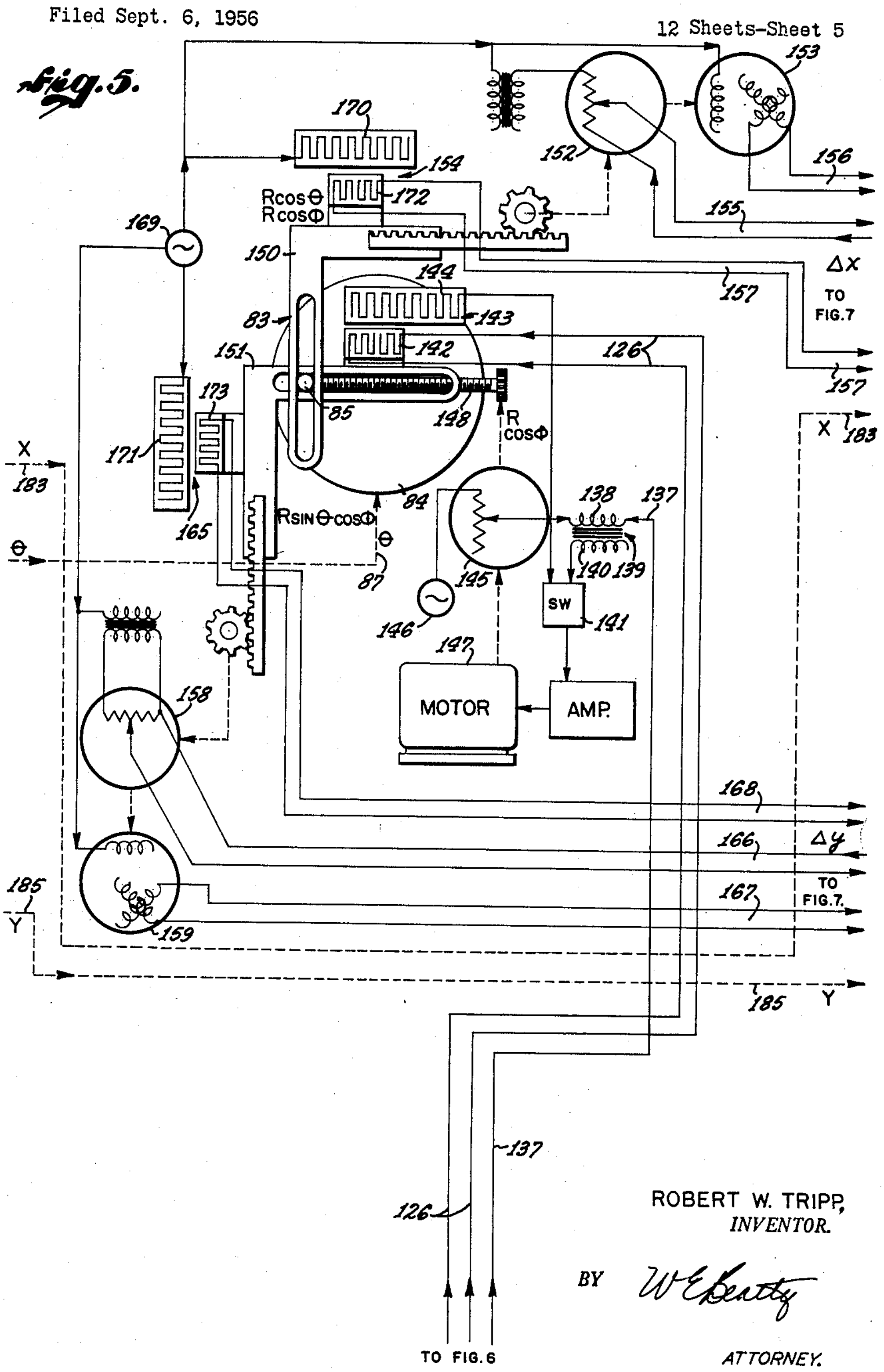
Figure 6:
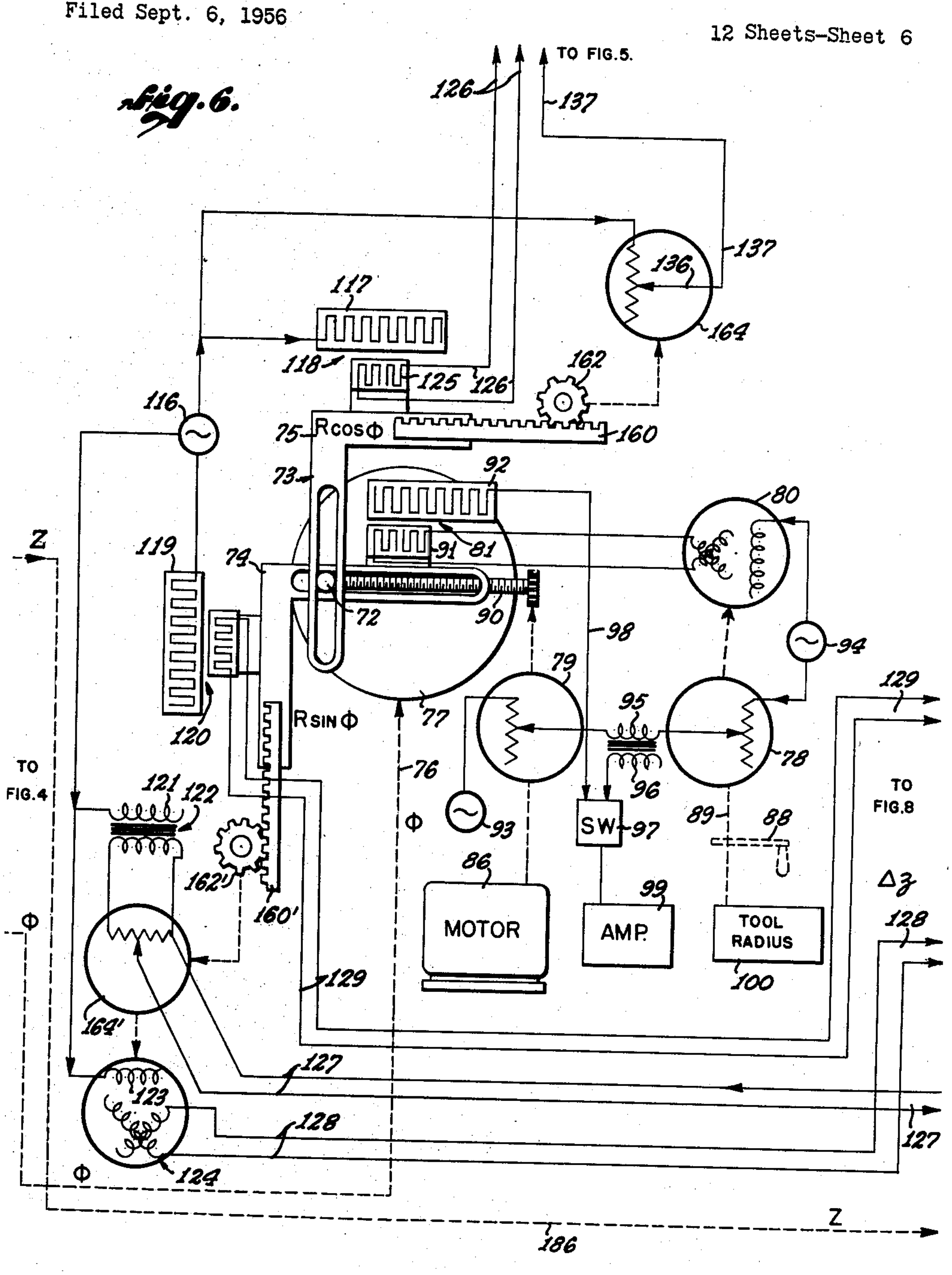

FIG. 5 schematically illustrates a shaft input of $\theta$ from FIG. 1 with a tool radius resolver for obtaining the tool radius correction increments $\Delta x$ and $\Delta y$, the resolvers in FIG. 5 also having an input from FIG. 6 which schematically shows a tool radius computer for computing the tool radius correction increment $\Delta z$, and having a shaft input of angle $\phi$ from FIG. 2 and also an input of tool radius R.

Figure 3:
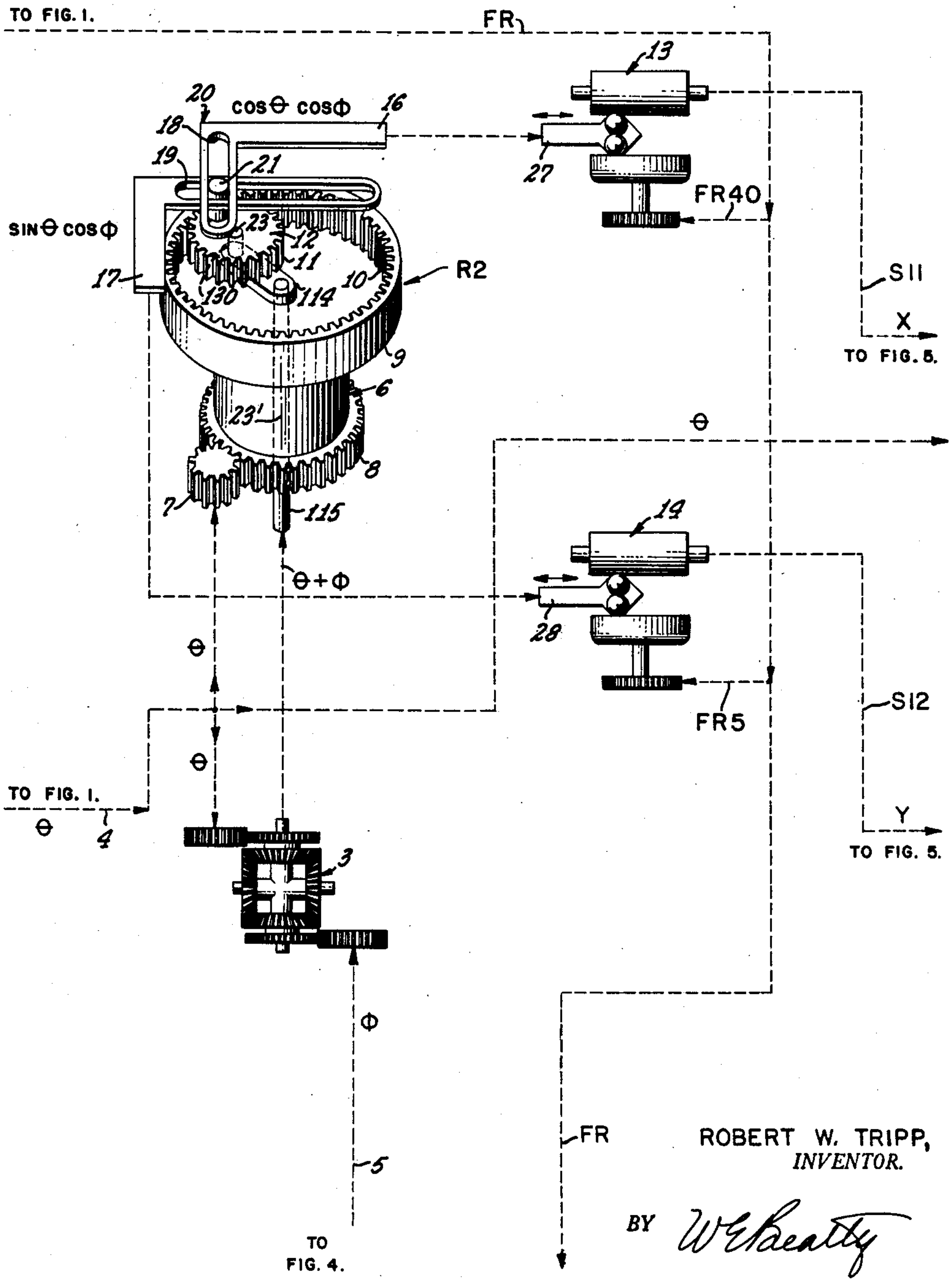
FIG. 3 is a schematic diagram showing schematically in perspective a component solver having inputs of $\theta$ and $\theta+\phi$ and having outputs of sin $\theta$ cos $\phi$ and cos $\theta$ cos $\phi$ with integrators for integrating the feed rate with such components.
Figure 7:
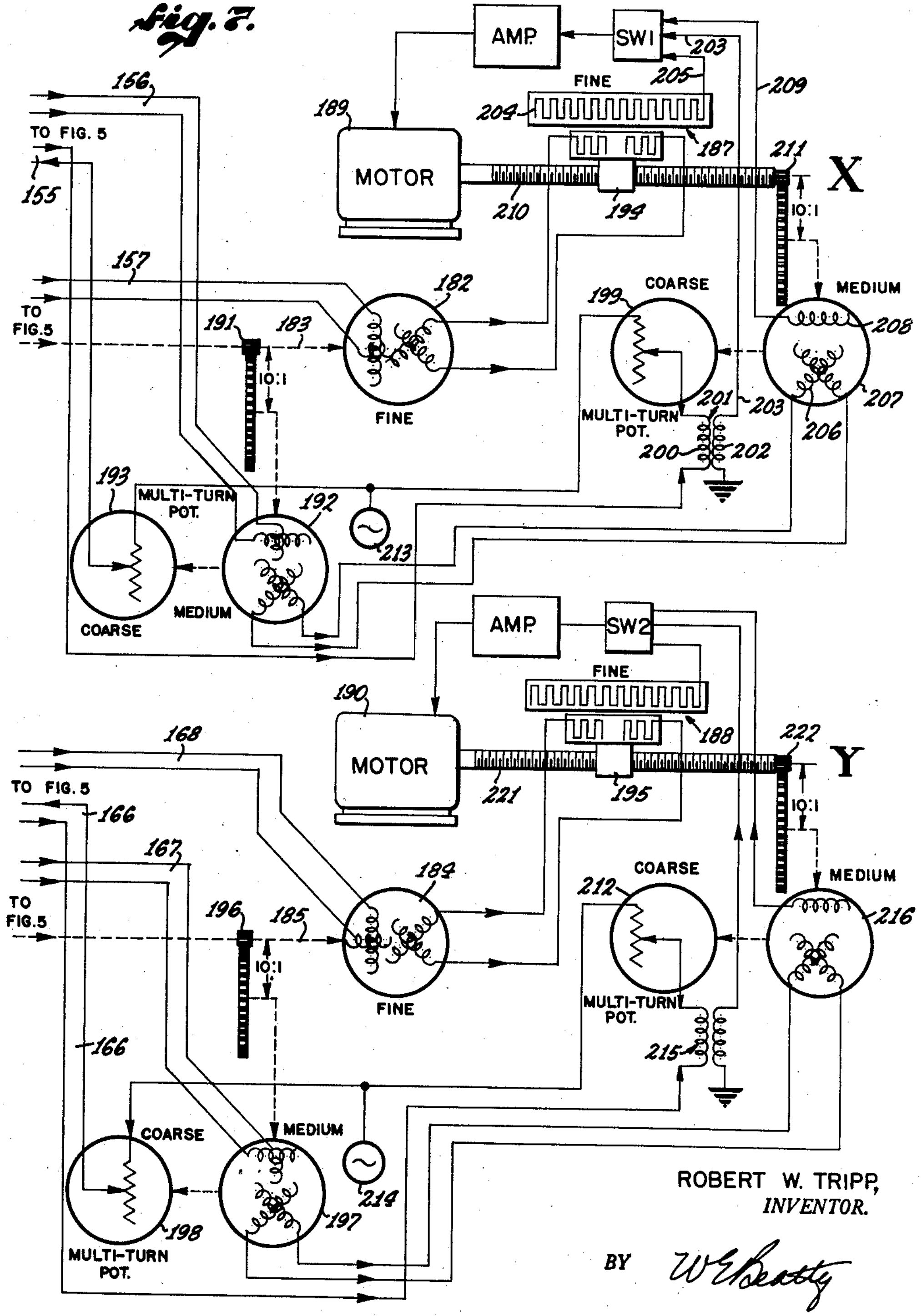

FIG. 7 schematically illustrates the machine or driven elements on the X and Y axes, as controlled in coarse, medium and fine increments of X and Y shaft inputs from FIG. 3 and as modified by the coarse, medium and fine increments of the tool radius corrections $\Delta x$ and $\Delta y$.

Figure 8:
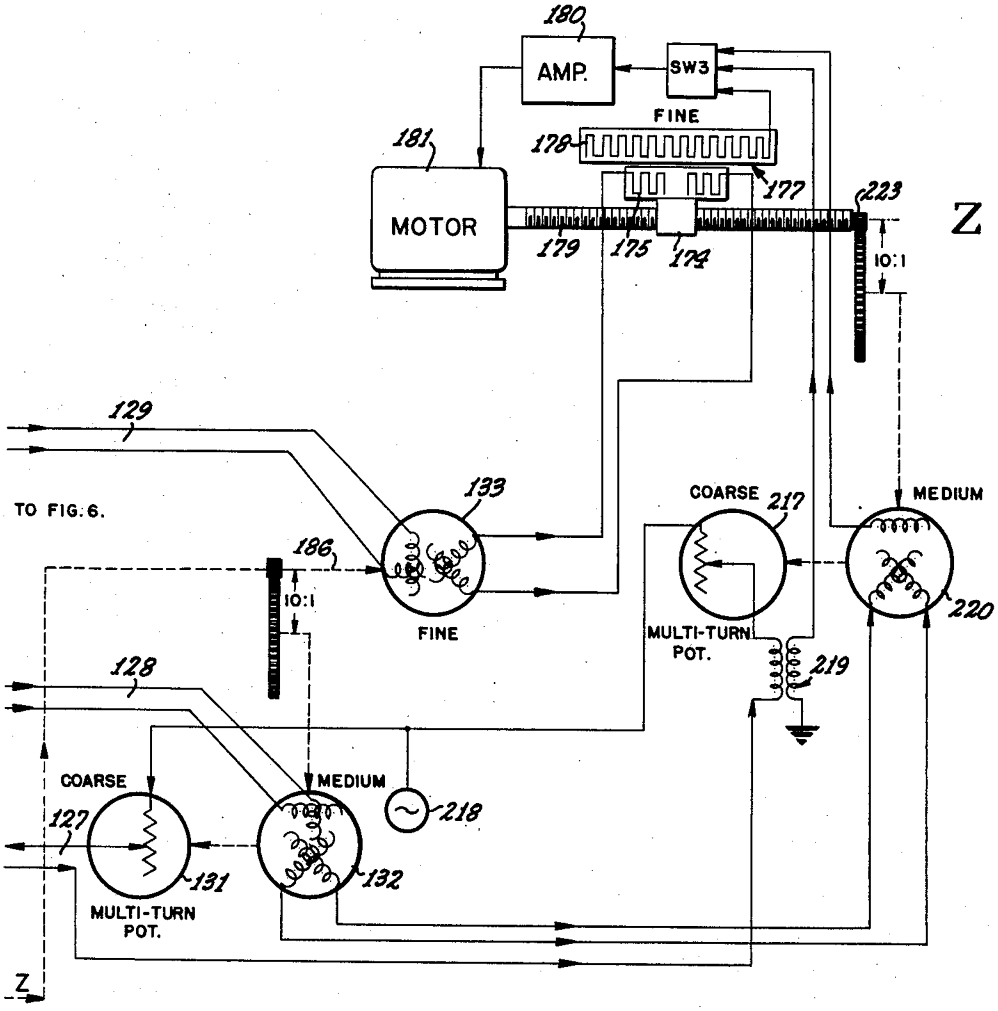

FIG. 8 corresponds to FIG. 7 in showing a similar coarse, medium and fine control of the machine or driven elements for the Z axis as determined by the Z shaft input from FIG. 4 as modified by the tool radius correction $\Delta z$ from FIG. 6.

Figure 9:
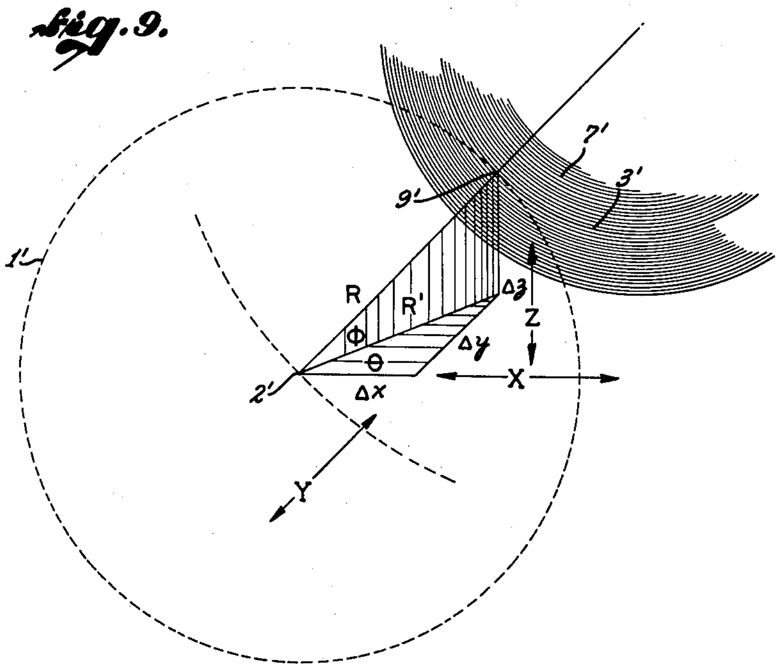

FIG. 9 is a schematic diagram illustrating the radius R of a spherical cutter, and the cutter correction components $\Delta x$, $\Delta y$ and $\Delta z$.

Figure 10:
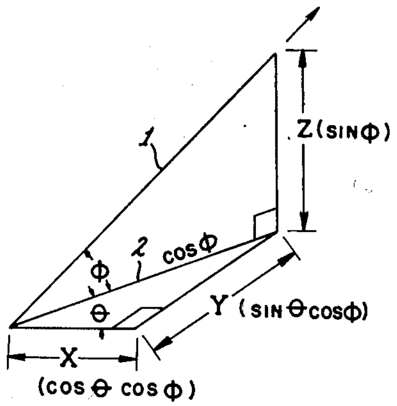

FIG. 10 is a schematic view of the components of the tool path.

Figures 1, 2, 3, 4, 5, 6, 7, 8, 11:
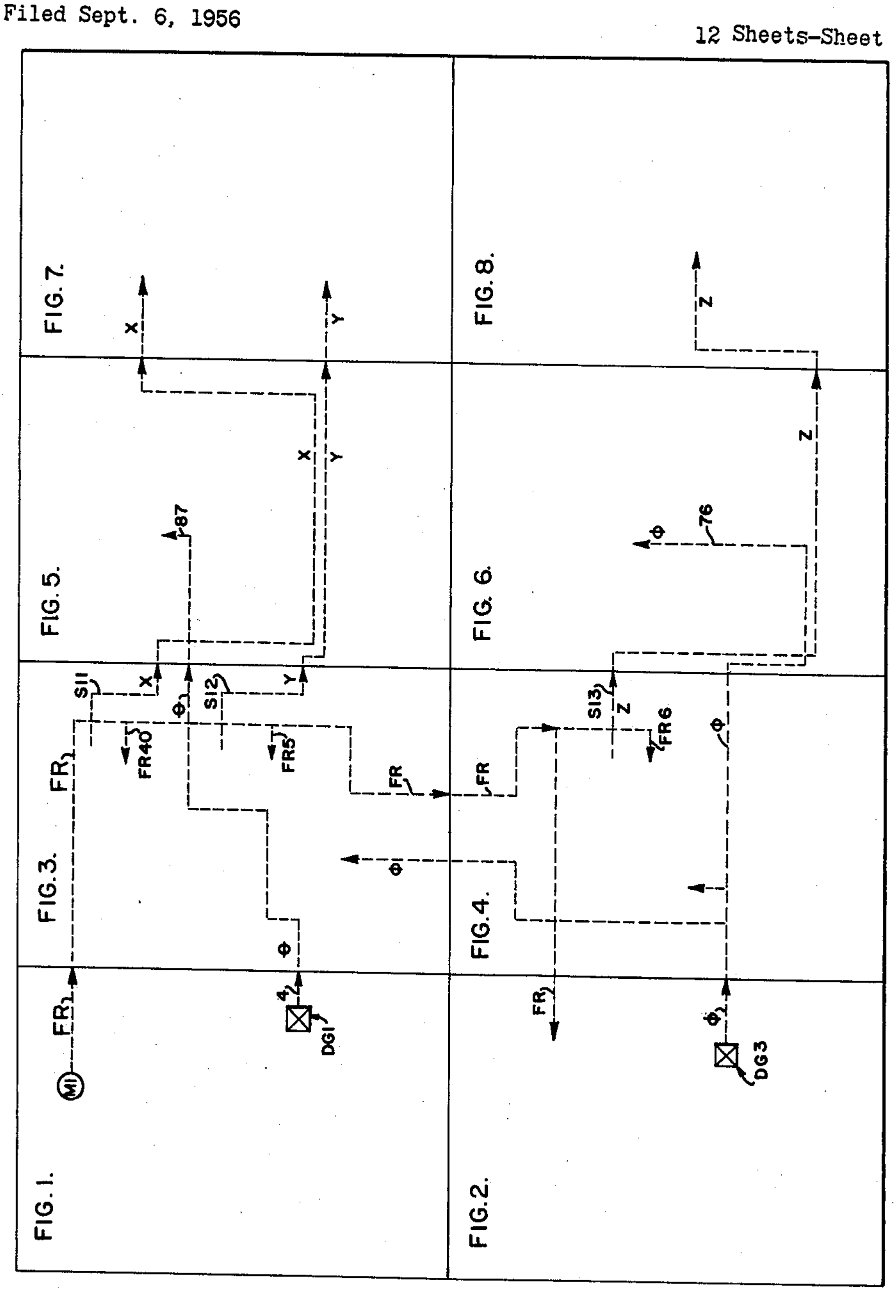

FIG. 11 is a schematic diagram showing how FIGS. 1 to 8 fit together to make a complete system, the principal shaft drives being indicated in broken lines.

Figure 12:
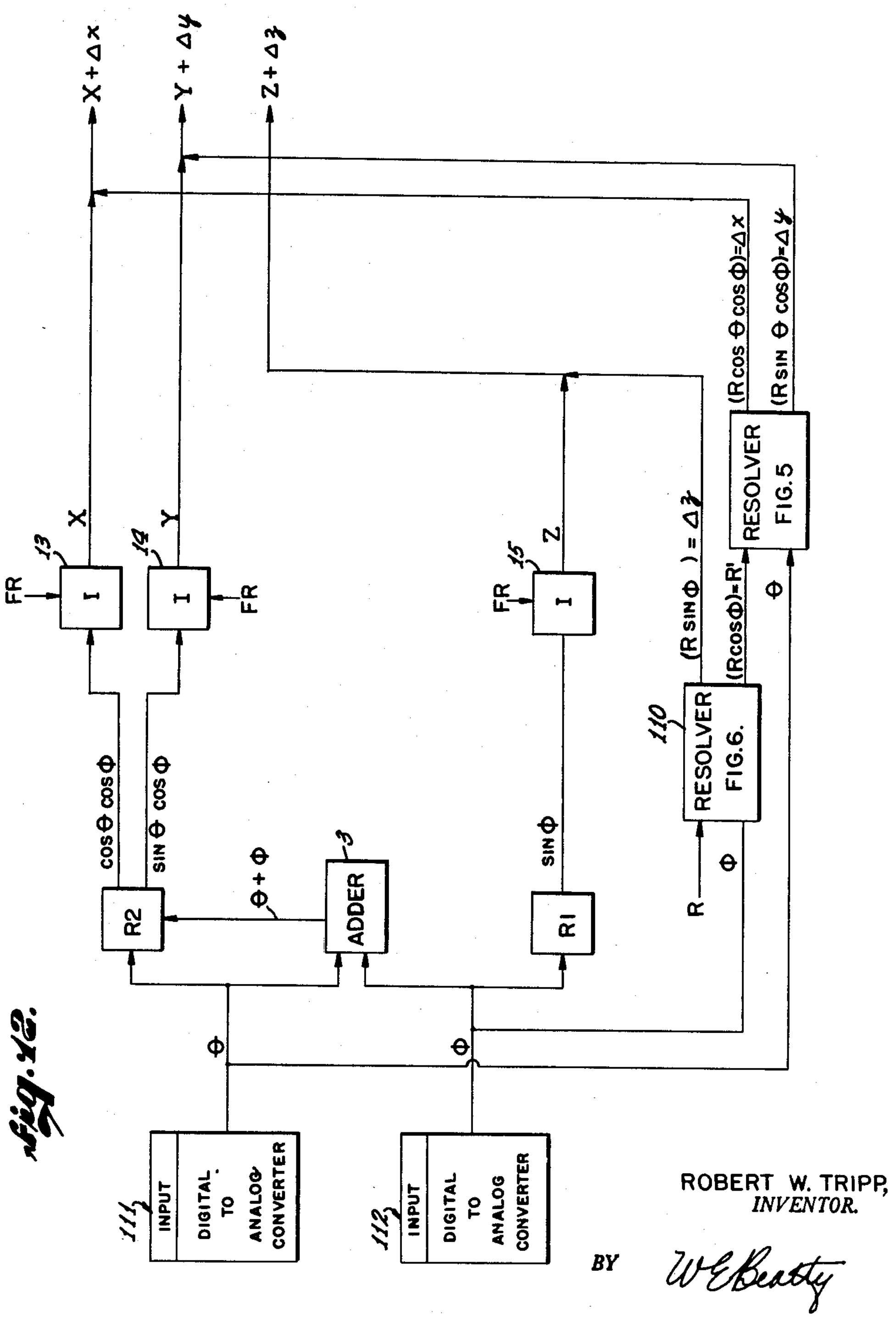

FIG. 12 is a schematic diagram illustrating the system in FIGS. 1 to 8.

Figure 13:
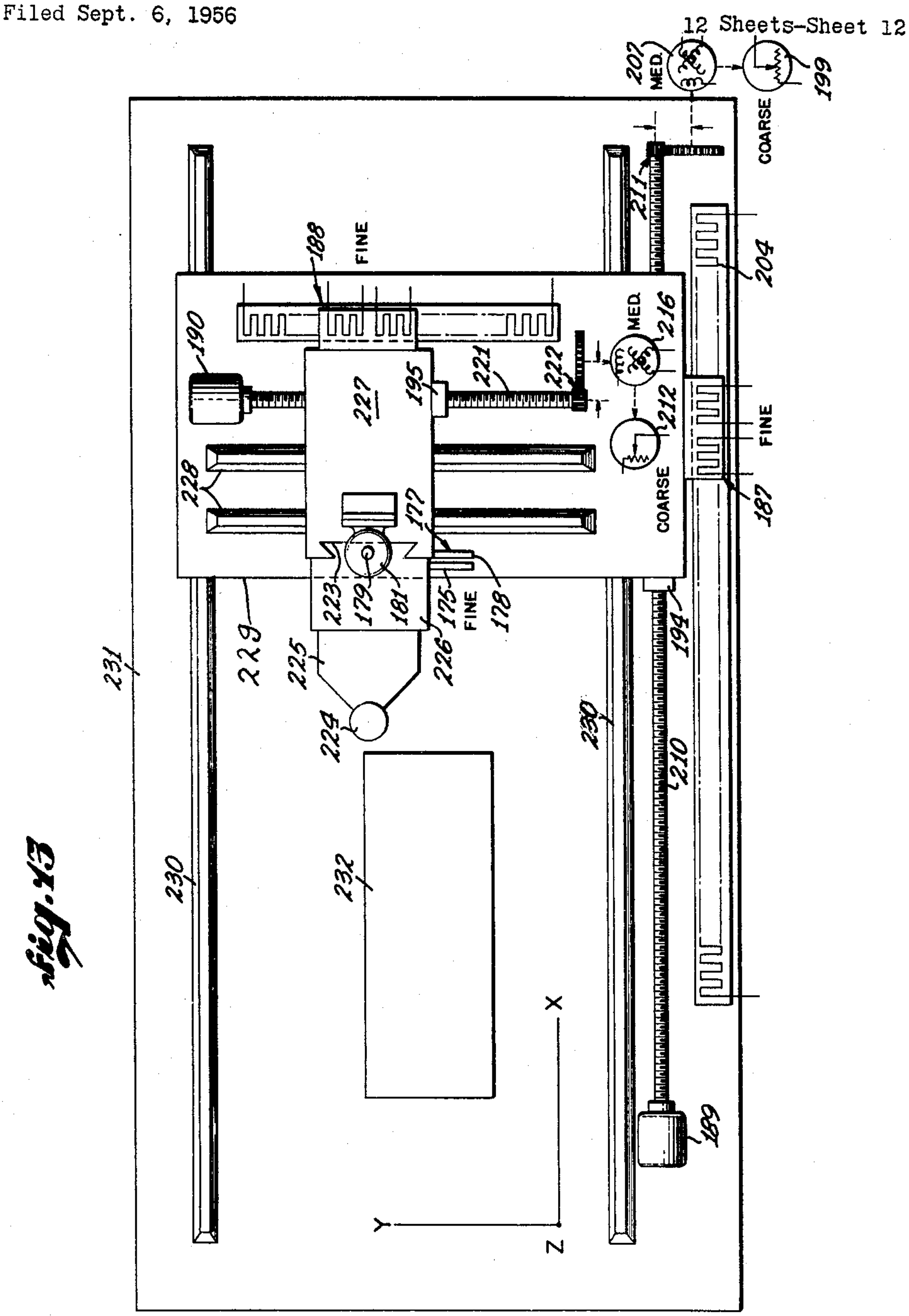

FIG. 13 is a plan view of a machine tool having drives along X, Y and Z axes for advancing a workpiece and a cutter or tool relatively to each other.

While the drawings and description deal specifically with 3D operation, the system shown and described is useful for 2D operation, $\phi$ being zero, so that sin $\phi$ is zero and cos $\phi$ is one. For 2D operation, the sine and cosine of $\theta$ are integrated with the feed rate.

Referring in detail to the drawings, as shown in FIG. 10, the tool path 1 is illustrated with reference to the three dimensional coordinate axes X, Y and Z, the angle $\theta$ representing the angle between the X axis and the tool path component 2 in the X, Y plane while the angle $\phi$ represents the angle that the tool path 1 is or extends above or out of the X, Y plane. As disclosed and claimed in S.N. 608,024, now Patent 2,843,811, July 15, 1958, means are provided for supplying analog values of $\theta$ and $\phi$ and for resolving these angles into their components X, Y and Z according to the following formulae, the tool path being considered as unity.

$X=\cos\theta\cos\phi$
$Y=\sin\theta\cos\phi$
$Z=\sin\phi$

The term sin $\phi$ or Z is solved with the resolver R1 in FIGS. 4 and 12, while the terms cos $\theta$ cos $\phi$ and sin $\theta$ cos $\phi$ are solved by the component solver R2 in FIGS. 3 and 12. As shown in FIG. 12, the component solver R2 has as inputs the value $\theta$ and also the value $\theta+\phi$ obtained from the adder 3 which has both $\theta$ and $\phi$ as inputs. Referring particularly to Patent 2,843,811, the component solver for X and Y is indicated at R2 in FIG. 9 and shown in detail in FIG. 3, the adder for the angles $\theta$ and $\phi$ is shown at 3 in FIG. 9 and in detail in FIG. 3, while the component solver for Z is indicated at R1 in FIG. 9 and shown in detail in FIG. 4; see also the general description of these elements appearing under the heading "2. Resolving Unit," page 7, line 19 to page 8, line 10.

By integrating the feed rate with values proportional to the components above described and shown in FIG. 10, the tool or other driven element is caused to follow a path in space in accordance with digital input data from FIGS. 1 and 2 appropriate to those angles. The X and Y machine drives are indicated in FIG. 7 while the Z machine drive is indicated in FIG. 8, as will be described in detail later.

FIG. 9 illustrates the tool radius corrections, $\Delta x$, $\Delta y$ and $\Delta z$ involved in applying the invention to the cutting of compoundly curved (non-cylindrical) surfaces by means of a spherical cutter. In FIG. 9, 1′ represents the periphery of a spherical cutter with center at 2′. 3′ represents the surface of the workpiece 7′ to be machined tangent to the cutter at 9′. The radius of the cutter, drawn normal to the surface 3′ is indicated at R, which extends at an angle $\phi$ to the plane defined by a pair of two dimensional coordinate axes X, Y to which a third coordinate axis Z is perpendicular. The projection of R in the X, Y plane is R′, which is inclined at an angle $\theta$ to the X axis. The radius R to be corrected for is thus broken down into three components $\Delta x$, $\Delta y$ and $\Delta z$. As shown in FIG. 12, such correction may be achieved by means of the resolvers in FIGS. 6 and 5, these resolvers being connected in tandem as shown in FIG. 12. The inputs to the resolver of FIG. 6 are R and $\phi$, the outputs being $\Delta z$ and R′. The inputs to the resolver of FIG. 5 are $\theta$ and R′, and its outputs are $\Delta x$ and $\Delta y$. By addition of the corrections $\Delta x$, $\Delta y$ and $\Delta z$ to the respective X, Y, and Z coordinates of the workpiece program, the cutter center can be correctly positioned to hold the cutter surface tangent to the desired workpiece surface. The correction $\Delta x$ is $R\cos\theta\cos\phi$, see column 14, line 70. The correction $\Delta y$ is $R\sin\theta\cos\phi$, see column 15, line 9. The correction $\Delta z$ is $R\sin\phi$, see column 15, line 24. The programmed data on the workpiece include the values of X, Y, Z and the angles $\phi$ and $\theta$.

Before proceeding with a detailed description, reference may be made to FIG. 12 which illustrates schematically the manner in which the angular components $\theta$ and $\phi$ are obtained and also how they are employed for bringing about the three dimensional control of the machine tool with correction for the radius of the tool. The tool radius itself is a separate and adjustable input and is represented at R in FIG. 12 as an input to the block 110 marked "Resolver FIG. 6." Block 111 represents the input and digital-to-analog converter of FIG. 1, having a shaft output carrying the instruction of the angle $\theta$. The block 112 represents the input and digital-to-analog converter of FIG. 2 having a shaft output carrying the instruction of angle $\phi$. The shaft instruction of $\theta$ and the shaft instruction of $\phi$ are added as indicated in adder 3 of FIG. 12, see also FIG. 3, and the values $\theta$ and $\theta+\phi$ are combined in the resolver R2 thus marked in FIGS. 3 and 12, providing the components cos $\theta$ cos $\phi$ and sin $\theta$ cos $\phi$, while the $\phi$ output from block 112 is resolved in resolver R1, thus marked in FIGS. 4 and 12, to provide the component sin $\phi$. The feed rate FR indicated in FIG. 12 is integrated with each of the three command components above mentioned by integrators 13 and 14 as shown in FIGS. 3 and 12 to provide the X and Y shaft rotations of the feed rates, the feed rate also being integrated by the third component as indicated by integrator 15 in FIGS. 4 and 12 to provide a shaft rotation of the "Z" component of the feed rate. As above explained, the tool radius corrections, as indicated at the bottom of FIG. 12 are derived from the resolvers in FIGS. 6 and 5. The tool radius corrections $\Delta x$, $\Delta y$ and $\Delta z$ are electrical in nature and they are added to the respective X, Y and Z shaft rotations by means of resolvers in FIGS. 7 and 8 to provide the outputs $X+\Delta x$, $Y+\Delta y$ and $Z+\Delta z$. In fact, the invention provides the X, Y and Z shaft instructions in coarse, medium and fine increments and also provides the electrical tool radius corrections $\Delta x$, $\Delta y$ and $\Delta z$ in coarse, medium and fine increments, for servoing the X, Y and Z machine elements indicated in FIGS. 7 and 8.

The X, Y and Z lead screws or machine elements of FIGS. 7 and 8 represent the conventional coordinate drives of a machine tool. The construction of the machine tool and its arrangement for advancing the cutter with respect to the workpiece may be as shown in FIG. 13, or the spindle which supports the cutter may be fixed and the workpiece advanced with respect to it. The diagrammatic showing of FIG. 13 illustrates how orthogonal drives may be provided for advancing a workpiece with respect to a rotating cutter to form on the workpiece a contour which may be defined in advance as a function of rectangular coordinates whose axes are parallel respectively to the perpendicular directions of relative cutter-workpiece motion provided by such drives.

In FIG. 13, the bed 231 of a machine tool has removably fixed thereto a workpiece 232 for engagement with a cutter 224. Ways 230 on the bed support a carriage 229, coupled at nut 194 to lead screw 210 which is journaled in the bed, and driven by motor 189. Carriage 229 itself is provided with ways 228 perpendicular to ways 230, and a carriage 227 riding on ways 228 is coupled by nut 195 to lead screw 221, journaled in carriage 227 and driven by motor 190. The cutter 224 is spindled in a head 225 attached to carriage 226 with its axis and with ways or slide 223 and lead screw 179 perpendicular to the plane of motion of carriage 227. X, Y and Z coordinate axes are shown on the bed 231 parallel to the ways 230, 228, and 223 respectively.

The following additional general description may also be considered as it includes a further explanation of the relation between the present application, the corresponding two dimensional case S.N. 557,035, Patent 2,875,390, February 24, 1959, and the three dimensional case Patent 2,843,811.

Patent 2,875,390 describes and claims three basic parts, disclosed herein, as follows:

(1) The command unit of FIG. 1 which determines continuously varying values of angle $\theta$ at shaft 4 from decimal, digital inputs D3 of slope, D4 of curvature, D5 of rate of change of curvature and D2 of feed rate; referring to Patent 2,875,390, the corresponding input is shown at D1 to D4 in FIG. 1 and the corresponding shaft is shown at 8 in FIGS. 16 and 17.

(2) The resolving unit which operates on the values of angle θ and values of the feed rate to determine the X and Y coordinates in terms of the angular position of the shaft corresponding to shaft 4 in FIG. 1; referring to Patent 2,875,390, the corresponding resolver is shown at R3 in FIG. 17.

(3) The driving unit similar to present FIG. 7, which converts the X and Y shaft instructions to coarse, medium and fine electrical signals which in turn cause the machine elements to servo to the correct positions; referring to Patent 2,875,390, the corresponding driving unit is shown in FIG. 18, having coarse, medium and fine data elements at 322, 329 and 302 respectively, for axis X and similar data elements for axis Y.

Generally speaking, the two dimensional case has been extended to three dimensions as disclosed and claimed in Patent 2,843,811, by making the following improvements:

(1) *Command Unit.* The command unit includes not only the command unit of FIG. 1 as described above for obtaining continuously varying values of angle θ at shaft 4, but it also includes, as shown in FIG. 2, decimal digital values and inputs D6 of slope, D7 of curvature and D8 of rate of curvature change and digital-to-analog converters controlled thereby for obtaining continuously varying values of angle φ at shaft 5. The shaft instruction of angle φ is an input to the resolver of present FIG. 6, and the latter supplies an input to the resolver of FIG. 5, to provide a separate control for the tool radius on a three dimensional basis, according to the present invention.

(2) *Resolving Unit.* As above described in connection with FIG. 10, taking the tool path as unity, its component $Z=\sin\phi$ is obtained with a conventional resolver R1 in FIGS. 4 and 12, while its other components $X=\cos\theta\cos\phi$ and $Y=\sin\theta\cos\phi$ are obtained with the resolver R2 in FIGS. 3 and 12. The resolver R2 is an improved component solver described and claimed in Patent 2,843,811, and while a detailed description of this mechanism will be given later, at this point it may be noted that this resolver R2 is a combination of three devices, namely:

(*a*) A sine-cosine mechanism.

(*b*) A planetary differential, in that the outer frame 6 is driven about its axis at angle θ (by pinion 7 which drives gear 8 on frame 6) frame 6 having a ring gear 9 having inwardly extending teeth 10 which mesh with the teeth 11 on planetary gear 12 which rotates about its axis and having a rotary support 130 at the outer end of a crank 114, the inner end of crank 114 being fixed to shaft 115 which rotates on the axis of frame 6 at angle $\theta+\phi$. The sum of θ and φ is the output of adder 3 in FIGS. 3 and 12, FIG. 3 showing this adder as a differential gear unit having inputs of θ from shaft 4 in FIG. 1 and φ from shaft 5 in FIG. 2, via FIG. 4.

(*c*) A resolver, in that the sliders 16 and 17 have slots 18 and 19 of a Scotch yoke mechanism 20 applied to the crank pin 21 on gear 12 which rotates inside of ring gear 9.

(3) *Driving Unit.* In addition to the drives for the X and Y machine elements as in FIG. 7, the invention adds a drive for the Z machine element as in FIG. 8, wherein the null for the servo system of motor 181 is displaced by the differential synchro transmitter 133 in accordance with the Z component of the tool radius control on line 129 from FIG. 6.

The invention will be described in further detail under the following headings, which represent various components of the machine control method and system; feed rate, the command unit of FIG. 1, command unit of FIG. 2, component solver of FIG. 3, resolver of FIG. 4, tool radius computer of FIGS. 5 and 6, the X and Y driving units of FIG. 7, the Z driving unit of FIG. 8, program advance and supervisory control of feed rate, and general operation.

*Feed Rate*

In FIG. 1, the input D2 supplies a decimal digital input of feed rate to the analog feed converter 24 which supplies a voltage as disclosed in Patent 2,875,390 for comparison with the voltage of tachometer 25 driven by feed rate motor M1; referring to Patent 2,875,390, see FIGS. 2 and 13, and page 38, lines 18 to 26. The servo indicated at 26 drives the motor M1 at such a rate that the difference between the voltage generated by the stepping switch conversion circuit, not shown, of the converter 24 and the tachometer 25 is essentially zero.

The feed rate motor M1 drives the feed rate shaft FR which in FIG. 1 is also an input indicated at FR3 to the variable gear ratio VG1, described later and also an input indicated at FR4 to the ball-disk-cylinder integrator BDC1, described later.

As shown in FIG. 3, the feed rate FR is also an input indicated at FR40 to the ball-disk-cylinder integrator 13, and an input FR5 to the ball-disk-cylinder integrator 14, these integrators, as later described, being controlled by the sliders 16 and 17 of resolver R2, pertaining to the X and Y machine elements.

As shown in FIG. 4, the feed rate FR is an input FR6 to the ball-disk-cylinder integrator 15 in the output of resolver R1 and pertaining to the Z machine element.

As shown in FIG. 2, the feed rate FR is also an input FR7 to the variable gear ratio VG2 and an input FR8 to the ball-disk-cylinder integrator 22 later described.

*Command Unit of FIG. 1*

In FIG. 1, the slope data D3 represents a decimal number in terms of angles, the curvature data D4 represents a decimal number in terms of the reciprocal of radius and the rate of curvature change data D5 represents a number in terms of speed, the speed number, as described and claimed in Patent 2,875,390 being in a system of numeration having a radix of 2 to the Nth power, where N is an integer here shown as 3, the system being octal; referring to Patent 2,875,390, see the description under the heading (*a*) Octal-to-binary translator.

The slope θ of the component 2 in the X, Y plane of the tool path 1, see FIG. 10, depends upon the ratio of the feed rates of the corresponding X and Y machine elements of FIG. 7. This ratio is established with a single datum of input information D3. This is accomplished by positioning the shaft 4 in FIG. 1 in accordance with the slope data D3 and by resolving the angular position of the feed rate resolver R2 in FIG. 3 into co-function controls in space quadrature, by operating the ball slides 27 and 28 of resolver R2 as inputs for the integrators 13 and 14 to establish the feed rates at shafts S11 and S12, FIG. 3, to establish the feed rate ratio on the X and Y axes.

The resolver shaft position θ is established from input information D3 of slope angles expressed in terms of angles on a decimal basis, a dital-to-analog converter 44 being provided to convert this input to the angular position θ of shaft 4 as described and claimed in co-pending application S.N. 540,748, filed October 17, 1955, by R. W. Tripp, for "Automatic Shaft Control," Patent 2,839,711, June 17, 1958, and assigned to the assignee of the present application, referring to Patent 2,839,711, the shaft 8 in FIG. 7 is positioned by the angle data 1 in FIG. 1, that application also disclosing and claiming a computer for computing the sine and cosine values of an angle equal to the sum of the angles represented by the digits in decimally related digital groups as indicated by the input D3, the position of shaft 8 in FIG. 7 of Patent 2,839,711, being controlled by the cosine and sine coils 34, 35 of the coarse data element 37 and by coils 130 and 131 of the fine data element 68, the converter including the 100° and 10° step computers of FIG. 1, the decimal to noval converter of FIGS. 1 and 2, the 1°, step computer of FIG. 5, the .1° step computer of FIG. 3, the quadrant converter of FIG. 6 and the accompanying description. Said applications also disclose and claim producing the co-function sine and cosine values of the angle in coarse and fine increments, the coarse increment being supplied to the coarse resolver 29, the fine increment to the Inductosyn 30. For example, the coarse increment of sine $\theta$ may be supplied to winding 31, the coarse increment of cos $\theta$ to winding 32, windings 31 and 32 being in space quadrature and inductively related to the relatively rotatable winding 33 having a driving connection as indicated at 34 to the relatively rotatable winding 35 of Inductosyn 30. The fine increment of sin $\theta$ may be supplied to winding 36, the fine increment of cos $\theta$ to winding 37. Windings 36 and 37 are inductively related to the relatively rotatable winding 35, the latter having a driving connection indicated at 38 to gear 39 of differential gear DG1. Gear 39 is connected by gear 40 to servo motor 41 having an amplifier 42 and controlled by a well known synchro switch 43. Motor 41 provides a shaft input to the differential gear DG1 and operates it to thereby operate resolver 29 and Inductosyn 30, in turn to reduce to zero the error current in windings 33 and 35, whereby shaft 4 is driven to an angular position or to continuously varying positions in accordance with the data D3.

Patent 2,849,668 describes and claims a decimal input in terms of a linear dimension and computes the sum of angles corresponding to the linear input for supply to data elements in a servosystem, the linear input 4 of FIG. 4 and applying also to FIGS. 5 to 9 as indicated, operating the computer of those figures to operate the coarse, medium and fine data elements 1, 2 and 3 of FIG. 10.

Application S.N. 540,429 is now Patent 2,849,668, August 26, 1958.

The circuit of motor 41 is controlled by a switch S30 later described.

As described and claimed in the above mentioned patent applications, the ratio of the speed rates of the driven elements on the X and Y axes is changed, as required for a circular path, i.e., part or all of a circle, with a single datum of curvature input information D4. The input D4 thus provides curvature input information on a decimal basis in terms of curvature (reciprocal of radius) and the converter 45 converts this digital data to an analog value expressed as a shaft speed for addition to the position of shaft 4 as determined by the slope control D3.

As described and claimed in Patent 2,875,390, the differential gear DG2 has a spider having an output shaft S5 driven at a speed equal to the sum of the speed of shaft S3 from the rate of curvature change and the speed of shaft S2 driven by servo motor M2; referring to Patent 2,875,390, to differential gear DG4 in FIG. 15 and description page 31, lines 11 to 26. The shaft S5 is a part of the spider and it has a driving connection 46 with the slider 47 of a potentiometer 48, the servo circuit including motor M2 and amplifier 49 driving the shaft S2 and hence gears 50 and 51 and gear 52 to a position or at a speed which reduces to zero the error current determined by the difference between the potentials established by the position of slider 47 and the curvature instruction from converter 45, as set up in the input D4.

Switch S10 is similar in function to switch S30, to render its servo motor M2 inactive at certain times as described later.

The shaft S5 thus in part at least is driven to a position or at a rate dependent upon the curvature instruction in the input D4. Shaft S5 operates gear 53 which operates the ball slide 54 to integrate the feed rate drive FR4 accordingly, the output shaft S1 being added through gears 55 and 56 to the shaft 4 through the differential gear DG1.

As described and claimed in Patent 2,875,390, the rate of change of curvature input data D5 is converted into analog form to provide a position or continuously varying speed values of shaft S3 which is added through differential gear DG2 to the position or speed of shaft S5, whereby the curvature instruction in shaft S5 is thus modified in accordance with the rate of curvature change instruction in the input D5.

Hence the $\theta$ shaft 4 in FIG. 1 is controlled by the combined effect of the instructions in all of the inputs D3, D4 and D5, whereby the combined effect of all of these instructions may be resolved into co-function space quadrature feed rates for the X and Y drives.

*Command Unit of FIG. 2*

Referring to FIG. 2, the circuit here shown is similar to the circuit in FIG. 1, the slope input D6, the curvature input D7 and the rate of curvature change D8 corresponding to the inputs D3, D4 and D5 respectively. The circuits and devices controlled by the inputs D6, D7 and D8 are also similar to the corresponding items in FIG. 1, with this main difference, that the inputs D6, D7 and D8 have values appropriate to positioning or driving the shaft 5 at the angle $\phi$, appropriate to the Z machine element, see FIGS. 8, 12.

Accordingly, the slope data in the input D6 is converted by converter 60 into coarse and fine increments of sine and cosine values by the coarse resolver 61 and the Inductosyn 62 which are driven by the servo motor 63, under control of synchro switch 64, to reduce the error current to zero, as previously described, to thereby drive shaft 5 through differential gear DG3 as called for by the slope input D6. The position or rate of shaft 5 is varied by the curvature input D7 acting through the digital-to-analog converter 68 and servo motor 65, differential gear DG4, shaft 66, ball slide 67 to integrate the feed rate FR8 and provide a shaft output S6 which is added through differential gear DG3 to the shaft 5. Also, the curvature shaft output S6 is modified in accordance with the rate of curvature change instruction in the input D8 through the addition of the shaft output S7, from variable gear ratio VG2, through differential gear DG4, to shaft 66 and the input of ball slide 67 to the integrator BDC5. The input D8 controls the digital-to-analog converter 69 which controls the variable gear ratio VG2 having the feed rate input FR7.

The servo circuits of motors 63 and 65 in FIG. 2 are controlled by switches S8 and S9, as in FIG. 1, and later described.

The $\phi$ output of shaft 5 is thus in accordance with the combined instructions in the inputs D6, D7 and D8.

*Component Solver of FIG. 3*

The terms cos $\theta$ cos $\phi$ $(X)$ and sin $\theta$ cos $\phi$ $(Y)$ are solved by the component solver R2 in FIG. 3.

The planetary gear 12 is so mounted that it will rotate about its center 130 while being driven by shaft 115 through crank 114. Gear 12 meshes with ring gear 9, its pitch diameter being equal to ½ that of ring gear 9. Pin 21 is integral with gear 12, and is located on the pitch line. It drives the Scotch yoke 20 having yokes or sliders 16 and 17. Ring gear 9 is itself driven about its axis 23' by pinion 7 acting through gear 8. The distance of pin 21 from axis 23 will be referred to as R''.

The component solver R2 is a combination of the following three devices.

(1) As a planetary differential, if the center 23 of gear 12 is rotated about axis 23' by angle $\alpha$, and if ring gear 9 is rotated about its axis 23' by angle $\theta$, then planetary gear 12 will rotate about its own center 23 by angle $\alpha-\theta$.

(2) With ring gear 9 fixed, as planetary gear 12 is rotated about its center 23 by an angle $\phi$, pin 21 will proceed in a straight line across the diameter of ring gear 9 in such a way that its distance R'' from axis 23' is proportional to cos $\phi$. It can be seen that with ring gear 9 free to rotate, this proportionality still holds, with respect to ring gear 9.

(3) As a resolver, if ring gear 9 is rotated about its axis 23' at an angle $\theta$, then pin 21 will cause yokes or sliders 16 and 17 to move proportionally to R'' cos $\theta$ and R'' sin $\theta$.

By combining the above three modes, output yokes or sliders 16 and 17 can be caused to move proportionally to sin $\theta$ cos $\phi$, and cos $\theta$ cos $\phi$, as follows:

(*a*) Revolve center 23 about axis 23' through an angle $\theta+\phi$, by turning shaft 115. Shaft 115 is operated by the sum of angle $\theta$ from FIG. 1 and $\phi$ from FIG. 2 via FIG. 4, these values being added in the differential gear or adder 3 which supplies the sum $\theta+\phi$ as an output for shaft 115.

(*b*) Rotate ring gear 9 through angle $\theta$, by turning gear 7, angle $\theta$ from FIG. 1 being an input to gear 7.

(*c*) By differential action, planetary gear 12 will rotate about its center 23 at an angle $\alpha-\theta$, where $\alpha=\theta+\phi$, namely at an angle $\theta+\phi-\theta$ or angle $\phi$.

Therefore, pin 21 will move along a diameter of ring gear 9 proportional to cos $\phi$, or R''=cos $\phi$.

But ring gear 9 has been rotated through angle $\theta$. Therefore, by resolver action, yokes or sliders 16 and 17 move amounts proportional to $R''$ sin $\theta$ and $R''$ cos $\theta$, or sin $\theta$ cos $\phi$, and cos $\theta$ cos $\phi$, respectively, since $R''$=cos $\phi$.

As above described, the ball slides 27 and 28 are actuated by the slides 16 and 17 respectively to integrate the feed rate FR40 and FR5 respectively supplied to the respective integrators 13 and 14, whereby the shafts S11 and S12 are driven at rates corresponding to the X and Y components of the tool path.

*Resolver of FIG. 4*

As above described, the angle $\phi$ instruction of shaft 5 from FIG. 2 is resolved by resolver R1 and its Scotch yoke slider 70 into a linear movement proportional to sin $\phi$, slider 70 actuating the ball slide 71 of the integrator BDC4 which has the feed rate input FR6, to provide a shaft output S13 carrying a feed rate instruction in accordance with the Z component of the tool path.

*Tool Radius Computer of FIGS. 5 and 6*

The value of R ordinarily changes only when the cutter is changed on the machine tool so that it is within the scope of the invention to provide for the setting of R by manual displacement of the pin 72 with respect to the axis of shaft 76. The embodiment of the invention illustrated includes means whereby the value of R as well as the value of $\theta$ and $\phi$ in the computers can be automatically and continuously varied. Such manual means for varying the value of R may take the form of a crank or handle 88 in FIG. 6 for operating the shaft 89 which operates the coarse potentiometer 78 and the fine resolver 80 which operate as transmitters for their respective coarse potentiometer receiver 79 and Inductosyn fine data element 81. Servomotor 86 drives the coarse element 79 and the screw 90 and screw 90 drives the Inductosyn slider 91 until the error signals from the coarse and fine elements 79 and 81 reach a null, as in usual servo practice.

In FIG. 6, pin 72 is on a carriage not shown driven by screw 90. The fine position data element coupled to this carriage for indication of the position of pin 72 is a precision linear position measuring transformer, generally indicated at 81. This transformer includes a scale member 92 fastened to table 77 and a slider member 91 fastened to the carriage not shown. The member 92 includes a continuous multipolar winding in which uniformly spaced conductors are connected in series and positioned to extend transversely of the relative direction of motion of the two transformer members as established by the lead screw 90. The transformer member 91 includes two basically similar multipolar windings which are, however, positioned to each other in space quadrature of the pole cycle comprising two adjacent conductors on the member 92. A reference source of voltage is shown at 93 for coarse element 79 and at 94 for elements 78 and 80. The swingers of elements 79 and 78 are connected in opposition through the primary winding 95 of a transformer having a secondary winding 96 which supplies the coarse error signal to the switch 97 which also receives the fine error signal in line 98 from the element 81. The error currents are controlled by switch 97 as well known and are amplified by amplifier 99 and fed to motor 86.

Also, shaft 89 which adjusts the radial position of pin 72 may be operated automatically and continuously by an R-data input indicated at 100, FIG. 6, which may for example include means for converting input data into a shaft rotation as shown and described in connection with the digital-to-analog slope converter 60 of FIG. 2.

Referring to FIG. 6, the motor 86 is controlled to drive pin 72 to positions such that the distance between the axis of pin 72 and of shaft 76 accurately represents the cutter radius R, and the shaft 76, indicated as an extension of shaft 5 is driven by the inputs to differential gear DG3 in FIG. 2 to a position such that the angular position of pin 72 about the axis of shaft 76 accurately represents, with reference to a prime direction, the angle $\phi$. In like manner, the pin 85 in FIG. 5 is driven to a position such that the distance between the axis of pin 85 and the axis of shaft 87, here indicated as an extension of shaft 4 in FIG. 1, corresponds to $R$ cos $\phi$, the shaft 87 being driven to a position determined by the inputs to differential gear DG1 in FIG. 1.

From the value of R and $\phi$ put into the computer of FIG. 6, the correction $\Delta z$ is developed, and from the values of $R$ cos $\phi$ and $\theta$ put into the computer of FIG. 5, the corrections $\Delta x$ and $\Delta y$ are developed, with a high degree of accuracy and circuits are provided for connecting FIG. 6 to FIG. 8 and for connecting FIG. 5 to FIG. 7 to combine the programmed X, Y and Z values from the inputs D3 to D8 FIGS. 1 and 2 as manifested in rotations of shafts 4 and 5 so that the X, Y and Z machine elements are operated to position the center of the machine tool with respect to the workpiece according to the values $X+\Delta x$, $Y+\Delta y$ and $Z+\Delta z$. It will be understood that whether the tool radius correction is added or subtracted depends on whether the relative position of the cutter with respect to the workpiece and the origin appropriate choice of leads determining whether addition or subtraction is made and shift from one to the other can be effected by the program advance.

For development of the correction $\Delta z$, the pin 72 (see FIG. 6) of the Scotch yoke device 73 engages two yokes 74 and 75, respectively constrained by bearing rods, not shown, to move perpendicularly to the axis shaft 76 and to each other. The Scotch yoke device 73 in FIG. 6 and the similar Scotch yoke device 83 in FIG. 5 are disclosed in the above mentioned S.N. 561,769, see FIG. 3 and is described and claimed in divisional application S.N. 633,900, filed January 14, 1957, by Robert W. Tripp for Tool Radius Correction Computer, now Patent 2,933,244, April 19, 1960. If when the angle $\phi$ in the program of the part to be cut is zero, the pin 72 and the axis of shaft 76 are spread apart the distance R, and if the table 77 thereafter rotates through the angle $\phi$, the yokes 74 and 75 will execute simple harmonic motion of amplitude or, that of yoke 74 being $R$ sin $\phi$ and that of yoke 75 being $R$ cos $\phi$. The direction of rotation of table 77 may be made to correspond to increase the values of the angle $\phi$. Because the values $\Delta x$, $\Delta y$ and $\Delta z$ must be determined to a high degree of accuracy, which may be of the order of a thousandth or a ten thousandths of an inch, the $\theta$ and $\phi$ values for the angular positions of the tables 84 and 77 and the R values for the radial position of pins 85 and 72 must be supplied with accuracies of the same order of magnitude, and means are provided to cause those elements to assume positions in accordance with the data thus supplied. To this end, the embodiment of FIGS. 5 and 6 includes both coarse and fine data indicating elements for indication of the $\theta$, $\phi$ and R values actually assumed by the computers, i.e., the angular position of tables 84 and 77 and the radial positions of pins 85 and 72. Referring to FIG. 6, the R value is indicated by the coarse transmitter 78, its coarse receiver 79 and by the fine transmitter 80 and its fine receiver 81. Referring to FIG. 2, the value of angle $\phi$ is indicated by the coarse data element 61 and by the fine data element 62.

The table 77 and its pin 72 are thus caused to assume positions in accordance with the values $\phi$ and R supplied to the computer of FIG. 6 from the basic program sources where digital values of R and $\phi$ are converted into analog values by means of the servo mechanisms described.

There have been thus far described the elements of the computer of FIGS. 6 and 12 by means of which the yokes 75 and 74 are caused to assume positions accurately corresponding to $R \cos \phi$ and $R \sin \phi$. The positions $R \sin \phi$ and $R \cos \phi$ so established are then transformed according to the invention into electrical signals for addition by suitable apparatus, to be described in exemplary form by reference to FIG. 8, to the $z$ program values for the profile to be imparted to the workpiece by the machine tool being controlled. This transformation is effected by means of position data elements coupled between the yokes 75 and 74 and the frame of the Scotch yoke device 73.

Both coarse and fine elements are required for generation of electrical signals representative of $R \sin \phi$ and $R \cos \phi$ in view of the accuracy demanded in machine tool operation, and it may be advantageous to break down the electrical data of $R \sin \phi$ and $R \cos \phi$ into coarse, medium and fine stages. FIG. 5 diagrammatically indicates such an embodiment of the computer 83 of the invention with 3 such stages for each of the $x$ and $y$ positions, while FIG. 6 shows computer 73 with 3 such stages for the $z$ position. For generation of coarse and medium position data each of the yokes 75 and 74 has associated therewith gear mechanism diagrammatically indicated as including a rack 160 and pinion 162 for position $R \cos \phi$ and rack 160' and pinion 162' for position $R \sin \phi$ generation of angular motion. This angular motion is coupled to a potentiometer 164 for $R \cos \phi$ and 164' for $R \sin \phi$ the tap of which is shifted from one end to the other of the potentiometer winding not more than once for the full travel of the yoke to which it is coupled. In this way unambiguous indications of the coarse increment of $R \sin \phi$, $R \cos \phi$ can be generated.

The linear movements of yokes 74 and 75 are broken down into coarse, medium and fine increments of electrical signals, for addition to the corresponding increments of the X, Y and Z command shaft instructions as follows. In FIG. 6, the reference source of voltage 116 supplies the potentiometer 164, the scale winding 117 of Inductosyn 118, the scale winding 119 of Inductosyn 120 acting as a fine data transmitter, the primary winding 121 of transformer 122 and the winding 123 of the medium resolver 124.

Inductosyn 118 has quadrature slider windings 125 which are mounted on and slide with the yoke 75 to transmit over the line 126 an electrical signal proportional to $R \cos \phi$. The potentiometer 164' transmits the coarse data component of $R \sin \phi$ and this potentiometer as well as medium resolver 124 are connected by suitable drive to the pinion 162' as indicated. The coarse, medium and fine electrical signals representative of $R \sin \phi$ are present in the output circuits 127, 128 and 129 of the coarse data element 164', the medium resolver 124 and the fine data Inductosyn 120 respectively. These values of $\Delta z$ are transmitted to the coarse, medium and fine transmitters 131, 132 and 133 in FIG. 8.

The coarse, medium and fine electrical values of $\Delta x$ and $\Delta y$ are computed in FIG. 5 with a computer which is quite similar to that shown in FIG. 6, one difference being that in FIG. 6 the computer 73 has an input of R, while in FIG. 5 the similar computer 83 has an input of $R \cos \phi$. This value of $R \cos \phi$ is an instruction in the yoke 75 and it appears in coarse increments in the potentiometer 164, the slider 136 of which is driven by the pinion 162, and this instruction appears as a fine increment in the quadrature windings 125. Windings 125 constitute a slider and are fixed to yoke 75 and are movable relatively to the stationary winding 117 of Inductosyn 118. The error current from potentiometer 164 passes over line 137 to the primary 138 of transformer 139 which has a secondary winding 140 connected to synchro switch 141 which corresponds to switch 97 in FIG. 6. The error current in line 126 from the slider 125 is fed to the quadrature windings 142 of Inductosyn 143, acting as a fine data receiver and having a stationary winding 144 connected to switch 141. The potentiometer 145 is a coarse receiver for the transmitter 164 and they are energized by a reference source of voltage 146. This reference source of voltage and others shown may be of the order of 10 kc., although other frequencies may be used. The servo motor 147 is coupled to the coarse receiver 145 and to the lead screw 148 which drives pin 85 as well as the quadrature windings 142. Switch 141 thus controls servo motor 147 to position pin 85 from the axis of shaft 87 by an amount corresponding to $R \cos \phi$. The table 84 is controlled by shaft 87 to the angular position $\theta$, and hence the computer, resolver or Scotch yoke device 83 resolves these instructions into a position of yoke 150 corresponding to $R \cos \theta \cos \phi$ with yoke 151 in a position corresponding to $R \sin \theta \cos \phi$. As explained in connection with FIG. 6, the motion or position of each of the yokes 150 and 151 is resolved into coarse, medium and fine increments. Accordingly, yoke 150 has the coarse, medium and fine data transmitters 152, 153 and 154 driven thereby which transmit their electrical signals over the lines 155, 156 and 157 respectively, the yoke 151 having similar coarse, medium and fine data transmitters driven thereby and indicated at 158, 159 and 165 respectively, which transmit their signals over the lines 166, 167 and 168 respectively. Application S.N. 656,692, filed May 2, 1957, now abandoned, is a division of S.N. 608,357 referred to above and describes and claims resolvers in tandem for computing three dimensional electrical components of a linear value R, like resolvers of FIGS. 5 and 6 as indicated at the bottom of FIG. 12 of the present application.

The data elements above described for computer 83 have a reference source of voltage 169.

The mechanical arrangement in the case of fine data elements like 81, 118 and 120 in FIG. 6, also 143, 154 and 165 in FIG. 5 is such that the windings of the two members of these Inductosyns, which conveniently lie on plane faces of insulating supports, are supported parallel to each other and at a close separation.

By a process which is the converse of that employed in transformer 143, from excitation of the single continuous windings 170 and 171 of Inductosyns 154 and 165 with an A.C. voltage from source 169, a suitable frequency for which may be of the order of 10 kilocycles, there will be developed in the quadrature windings 172 and 173 in-phase voltages whose amplitudes are related as the sine and cosine of the space phase between the two members of each Inductosyn or position measuring transformer within the pole cycle thereof, zero reference for this phase being that in which the voltage in one quadrature winding of each member is zero and the voltage in the other quadrature winding of that member is at a maximum. This is equivalent to saying that the voltages in the quadrature windings like 172 and 173, for example, are proportional to the sine and cosine of the angle through which a shaft would turn if geared to the linear motion of yokes 150 and 151 to make one revolution for travel of these yokes through the pole cycle of windings 170 and 171.

For each of transformers 154 and 165 therefore, the two secondary voltages so developed constitute electrical signals representative of fine increments in the $R \cos \theta$ cos $\phi$ and $R$ sin $\theta$ cos $\phi$ positions of the yokes 150 and 151, and these signals are employed for fine corrections of the position of the center of the rotating cutting tool with respect to the workpiece.

*X, Y and Z Driving Units of FIGS. 7 and 8*

Referring to FIGS. 7 and 8, there are coupled to nut 174 the quadrature winding member 175 of fine data linear position transformer or Inductosyn generally indicated at 177 similar to the transformers like 143, 165, etc., in FIGS. 5 and 6. The continuous winding member 178 of transformer 177 is fastened in the frame of reference with which lead screw 179 is journaled and with respect to which nut 174 moves. The single winding member 178 is connected into a servoloop including, for transformer 177 and its associated lead screw 179, an amplifier 180 and a motor 181. While each of the continuous windings and each of the quadrature windings of the transformers like 177 is a two-terminal winding, there is shown in FIGS. 5 to 8 for clarity only one lead or cable connecting to each of these transformer windings.

Referring to FIG. 8, if the quaudrature winding member 175 is energized with the pair of voltages in line 129 from Inductosyn 120 in FIG. 6, there will be induced in the member 178 error voltages which will, via the associated servoloop, drive the nut 174 to positions of zero error voltage, i.e., the nut 174 will be driven in accordance with fine increments in $R$ sin $\theta$. In order to drive nut 174 instead according to the sum of fine increments in $z-R$ sin $\theta$, means are provided for effecting addition of fine increments in the $z$ value to the fine increments in the $R$ sin $\theta$ output signals of the computer, the minus sign in the case of $R$ sin $\theta$ being taken care of by an appropriate selection of leads at member 120. When $z$ is available as a mechanical rotation, as it is in shaft 186, continuation of shaft S13, FIG. 3, such addition may be performed in differential resolvers like 133 for the $z$ coordinate. In FIG. 7, a similar differential resolver 182 is provided to add the fine increments of $\Delta x$ in line 157 and the command instruction X in shaft 183 which is a continuation of shaft S11, FIG. 3. Likewise the differential resolver 184 in FIG. 7 is provided to add the fine increments of $\Delta y$ in line 168 and the Y instruction in shaft 185, which is a continuation of shaft S12, FIG. 3.

These resolvers 133, 182 and 184, are transformers including relatively rotatable rotor and stator members having each a pair of windings in space quadrature. They are indicated diagrammatically in FIGS. 7 and 8 by means of circles axially coupled to shafts 183, 185 and 186, respectively represented by a dashed line. The shafts 183 and 185 are outputs of the X and Y integrators of FIG. 3. Shaft 186 is an output of the Z integrator of FIG. 4. With each circle for resolvers 133, 182 and 184 are shown two pairs of crossed windings. Each pair of windings represents two windings in space quadrature, one pair being on a stator member and the other on a rotor member, the shaft being coupled to the rotor member. The two windings of each pair are in space quadrature of the cycle of rotor-stator rotation over which the amplitude of the voltage induced from a winding of one pair into a winding of the other pair goes through a complete cycle from maximum amplitude in one time phase to maximum amplitude in the opposite time phase and back to maximum amplitude in the first time phase. This cycle usually amounts to 360° of rotor-stator rotation.

Either pair of quadrature windings may act as primaries and the other as secondaries. The variation with rotor-stator position in the amplitudes of the secondary voltages due to each primary voltage is sinusoidal, with a 90° difference in the phase of the variations between the two secondaries. Accordingly the voltage of each primary, as induced into its secondary, is resolved into components which are to each other as the sine and cosine of the departure of the transformer members from a reference angular position in which one secondary voltage is zero and the other is at a maximum. Resolvers are therefore capable of taking the sines and cosines of the sum of two angles, one angle being introduced in terms of rotor-stator position and the other in terms of the ratio of primary voltage amplitudes. Highly accurate resolvers of this type are described in the co-pending application of Robert W. Tripp, Serial No. 536,464, filed Sept. 26, 1955, entitled "Microsolver" which is assigned to the assignee hereof, now Patent 2,900,612, August 18, 1959.

For resolvers 182, 184 and 133 the rotor angle inputs represent increments in the X, Y and Z values of the desired workpiece contour. Program units D3 to D5 coupled to resolvers 182 and 184 via shafts 183 and 185, and program units D6 to D8 are coupled to resolver 133 via shaft 186, the mechanical outputs of the program units to these shafts being such that one rotation of those shafts represents in each case a change in X, Y or Z equal to the pole cycle of the transformer 177 in FIG. 8 and the corresponding transformers 187 and 188 in FIG. 7. The X and Y servo circuits including servo motors 189 and 190 are similar to the Z servo circuit which includes servo motor 181.

Shaft 183 is driven by the cylinder of the X integrator 13 in FIG. 3, and is an input to the fine data resolver 182, in FIG. 7, which operates as a transmitter for the fine data element 187, as well as an input through the 10 to 1 gearing 191 to the medium resolver transmitter 192 and the coarse potentiometer transmitter 193. These transmitter elements 182, 192 and 193, pertain to positioning the X machine element 194, in accordance with the algebraic sum of the command instruction in shaft 183 and the tool radius correction instruction in the form of electrical signals in the lines 157, 156 and 155 from their respective fine, medium and coarse data transmitters 154, 153 and 152 in FIG. 5. In a similar way, the Y machine element 195 receives its instruction, in part, from the command instruction in shaft 185 which operates the fine data resolver 184 which functions as a differential synchro transmitter for the fine data element 188, the shaft 185 operating through the 10 to 1 gearing 196 to operate the resolver 197 which functions as a differential synchro transmitter of medium data, and also operating the coarse potentiometer transmitter 198. These transmitter elements 184, 197 and 198 pertain to positioning the Y machine element 195 in accordance with the algebraic sum of the command instruction in shaft 185 and the tool radius correction instruction in the form of electrical signals in the lines 168, 167 and 166 from their respective fine, medium and coarse data transmitters 165, 159 and 158 in FIG. 5.

The coarse potentiometer 199 is a receiver for its transmitter 193 and is connected in opposition with its shaft instruction transmitter 193 and with its tool radius instruction transmitter 152 through the primary winding 200 of a transformer 201, a source of voltage 213 being provided for these elements. Transformer 201 has a secondary winding 202 which supuplies the coarse error signal to switch SW1 over line 203. The fine error signal from stationary winding 204 of transformer 187 is lead to switch SW1 over line 205. The four winding resolver 192 provides an input to the quadrature windings 206 of the medium resolver receiver 207 which has a single winding 208 which transmits the medium error signal over line 209 to switch SW1. The coarse receiver 199 and the medium resolver 207 are driven from shaft 210 through the 10 to 1 gearing 211, like gearing 191. As in usual servo practice, the servo-motor 189 drives the nut or driven element 194, in coarse, medium and fine increments as called for by the instruction in the transmitters 152 and 193, 192 and 182, this instruction being $R$ cos $\theta$ cos $\phi$ which is the X component of $\theta$ and $R$ cos $\phi$.

In a similar way for Y, the coarse potentiometer receiver 212 is provided for the coarse potentiometer transmitter 198 and the coarse potentiometer transmitter 158, a source 214 being provided, the coarse error signal being fed through transformer 215 to switch SW2 as described above. Also, the medium resolver 216 is a receiver for its transmitter 197, the coarse and medium elements 212 and 216 being driven from shaft 221 by the 10 to 1 gearing 222, and the coarse and medium error signals therefrom being supplied to switch SW2 to control servomotor 190 and to drive the driven element 195 to a position called for by the instruction in the transmitters 198 and 158, 197 and 184, this instruction being $R \sin \theta \cos \phi$ which is the Y component of $\theta$ and $R \cos \phi$.

In a similar way for Z, the coarse potentiometer receiver 217 is provided for the coarse potentiometer transmitter 131 and the coarse potentiometer transmitter 164′, a source 218 being provided, the coarse error signal being fed through transformer 219 to switch SW3, as described above. Also, the medium resolver 220 is a receiver for its transmitter 132, the coarse and medium elements 217 and 220 being driven from shaft 179 by the 10 to 1 gearing 223, and the coarse and medium error signals therefrom being supplied to switch SW3 to control servomotor 181 and to drive the driven element 174 to a position called for by the instruction in the transmitters 164′ and 131, 132 and 133, this instruction being $R \sin \phi$ which is the Z component of $\phi$ and R.

Referring to FIG. 6 if the pole cycle of the linear position measuring transformers 81, 118 and 120 is the same, as is conventient, the calibration of the R input data unit 100 should be such that one revolution of shaft 89 represents a change in R equal to the pole cycle of the transformers 187, 188 and 177. Negative values of R, for the cutting of inside as contrasted with outside profiles, may be realized by excursions of pin 72 in the opposite direction from the center of table 77.

Physically, the resolver-type fine data transmitting elements 182, 184 and 133, and their associated coarse data elements 193, 198 and 131 and medium elements 192 and 197 and 132 may conveniently be located at the program units D2 to D8 of FIGS. 1 and 2 where the shaft rotations therefor are directly available.

*Program Advance, Supervisory Control of Feed Rate, and General Operation*

In connection with the binary gear devices VG1 in FIG. 1 and VG2 in FIG. 2, Patent 2,875,390 describes and claims the sequence of operation of the binary gear device in relation to the program advance, with transfer of the input data on the card to stepping switches (not shown here) and the transfer of the decoded binary information on the steppers to holding circuits, to make such control available for quick speed change, while releasing the steppers to receive the next data. These features as described and claimed in Patent 2,875,390, include the octal-to-binary translator, differential gear ratio, and sequence of operation of the binary gear device in relation to the program advance. Such features are not being claimed here, but may be extended to three-dimensional operation as indicated herein. Referring to Patent 2,875,390, the octal-to-binary translator is described page 5, lines 3 to 23; also page 31, lines 27 to page 33, line 25 under the heading "Octal-to-Binary Translator." Referring to Patent 2,875,390, the differential gear ratio and conversion to shaft speed are described page 5, line 12 to page 6, line 10; also under the heading "Differential Gear Ratio" page 33, line 26 to page 34, line 12. Referring to Patent 2,875,390, see the paragraph under the heading "Sequence" page 6, lines 11 to 26; the paragraph under heading "Program Advance, etc." page 28, lines 10 to 31; and the matter under the heading "Sequence" page 34, line 13 to page 38, line 13. See also the paragraph under heading "Sequence" page 43, lines 11 to 23.

As disclosed and claimed in Patent 2,875,390, provision may be made for reversing the input or output of the binary gear ratio VG1 and VG2 in order to provide both negative and positive values of rate of change of curvature and a "Read-In" circuit may be provided to "Read" the punched card or tape at a relatively slow rate and during times when the previous information is being held in the double relays $2^0$ to $2^9$ on clutch coils, which makes it possible to change the information on the clutch coils very rapidly and at an accurately chosen time or under accurately chosen conditions. Referring to Patent 2,875,390, the reversal of the input or output of the binary gear ratio is described page 38, lines 1 to 13 in connection with FIG. 14 of that case.

The error signal circuits for motors M1, M2 and 41 in FIG. 1, also motors 65 and 63 in FIG. 2, motor M47 in FIG. 5, motor 86 in FIG.6, motors 189 and 190 FIG. 7 and motor 181 FIG. 8 are shown as a single line, whereas a complete circuit is understood and is well known.

Concerning the general operation, it is assumed that the origin is established by, (*a*) the machine itself in motion, (*b*) hand cranks on the machine, or (*c*) with a manual zero offset control as described and claimed in Patent 2,875,390, being also disclosed and claimed in S.N. 638,722, filed Feb. 7, 1957, for Zero Offset for Machine Control, now Patent 2,950,427, August 23, 1960.

It has been found unnecessary to stop the feed rate drive during the time that the slope and curvature servo motors are operating to adjust the shaft like $\theta$ and $\phi$ shafts 4 and 5 in accordance with the current segment of the input data and accordingly such control is not disclosed herein whereby the feed rate drive FR is maintained in continuous operation during the time successive bits of slope, curvature and rate of curvature change input data are adding their instructions to the $\theta$ and $\phi$ shafts. The switches indicated at S30 for motor 41, at S10 for motor M2 in FIG. 1 and also at S8 for motor 63 and at S9 for motor 65 in FIG. 2 each represents a manual or program advance switch which is closed at the start of adding a new bit of input instruction, each such switch being held closed until the error current to its respective motor is null, and each such switch again being actuated manually or by the program advance when the next bit of input data is to be added to the operation.

Various modifications may be made in the invention without departing from the spirit of the following claims.

I claim:

1. An automatic machine tool control system comprising means for driving driven elements along orthogonal X, Y and Z axes at feed rates, means for varying said feed rates in accordance with signals representative of three dimensional input data characteristic of the path of relative movement of said driven elements, means for supplying said signals, and a tool radius computer responsive to said data supplying means and means controlled thereby for each of said axes for offsetting the path of said driven elements by an amount equal to the tool radius.

2. A machine tool control system comprising means supplying signals representative of three dimensional input data pertinent to a tool position with reference to X, Y and Z axes, a shaft for each of said axes, converters responsive to said input data supplying means for angularly operating said shafts, means for resolving angular movement of said shafts into electrical values for drives along said axes, and a tool radius computer responsive to said input data supplying means for shifting the electrical values for each of said axes.

3. An automatic machine control system for driving driven elements along a path with respect to X, Y and Z orthogonal axes, said system comprising means supplying signals representative of input data in terms of said path, means for translating said signals into rotary movement of a shaft for each of said axes, a servo motor for each of said driven elements, coarse, medium and fine data elements responsive to each of said first mentioned shafts for controlling the corresponding said motor, and a tool radius computer responsive to said input data supplying means for displacing the said coarse, medium and fine data elements for each of said shafts.

4. The method of numerically controlling a machine tool having a radius, said method comprising supplying three dimensional input data exclusive of a correction for the radius of said tool, translating said data into electrical signals proportional to the coordinates of the desired surface of a workpiece in three dimensions with respect to X, Y and Z orthogonal axes, said coordinates and the slope angle $\theta$ of the component of said surface in the X, Y plane and the angle $\phi$ of said surface out of said plane pertaining to said X, Y and Z axes of reference, supplying separate input data of the tool radius correction as functions of said angles $\theta$ and $\phi$, translating said correction data into increments of said coordinate signals respectively, and providing a control for the tool by modifying said signals by their respective said increments.

5. A machine tool control comprising means for supplying a three dimensional command electrical signal representative of a tool path with respect to X, Y and Z axes exclusively of a correction for the tool radius, means for supplying a separate tool radius correction electrical signal for each of said axes and means comprising a differential synchro for each of said axes for summing the signals for each axis, said command signal supplying means comprising a mechanical input to each of said synchros, and said correction signal supplying means comprising an electrical input to each of said synchros.

6. A machine control having three machine elements on mutually perpendicular X, Y, and Z axes, said machine control comprising means for supplying signals representative of three dimensional input command data of said path exclusive of tool radius data, said path being identified with respect to X, Y and Z coordinates, said path component in the X, Y plane having a slope angle $\theta$, and said path having a slope angle $\phi$ above the X, Y plane, separate means for computing signals representative of continuously varying values of $\theta$ and also of $\phi$ from said data signals, means for resolving said signal values of $\phi$ into a control proportional to sin $\phi$, means for adding said signal values of $\theta$ and $\phi$, means for resolving the signal values of $\theta$ and the signal values of $\theta+\phi$ into controls proportional to cos $\theta$ cos $\phi$, and sin $\theta$ cos $\phi$, and means for controlling the speed of said three machine elements in accordance with said controls respectively, means comprising a separate signal representative of an input of variable value R, means for resolving said signal values of R, $\theta$ and $\phi$ into increments of said speed controls respectively, and means for modifying each of said speed controls in accordance with its said increment.

7. A machine control system comprising three feed rate drives, three machine drives mutually in space quadrature, means for controlling the speed ratio of said machine drives by said feed rate drives, said controlling means comprising a control drive, means for resolving said control drive into (first) and (second) co-function electrical signals, other means for resolving said second co-function signal into (third) and (fourth) co-function signals, three synchro resolvers each having a mechanical input of one of said feed rate drives, said synchro resolvers having an electrical input of said first, third and fourth co-function signals respectively, each of said synchro resolvers having an electrical output dependent on the summation of its respective said mechanical and electrical inputs, and a servo system for controlling each of said machine drives in accordance with the output of one of said synchro resolvers.

8. A machine control system according to claim 7, said first resolving means including means for generating said first co-function signal in a plurality of grades of increments, said second resolving means including means for generating each of said third and fourth co-function signals in a plurality of grades of increments, each of said synchro resolvers having a plurality of grades of increments for the corresponding grades of its respective electrical input, each of said synchro resolvers having an electrical output in a plurality of grades of increments, and each of said servo systems having a plurality of grades of drives corresponding to the grades of the electrical output from its respective synchro resolver.

9. Computing mechanism suitable for generating signals for controlling displacement of one part relative to another, comprising a source of signals representing three co-ordinates of a point which describes a locus on a three dimensional surface, means for deriving the direction ratios of the normal to the surface at said point, and manually presettable means responsive to said signals and said direction ratios for deriving control signals representing three co-ordinates of another point which describes the locus of a centre of a rolling body having a point of contact with said surface which constitutes said first mentioned point.

10. A machine tool control system comprising means for supplying a command electrical signal for directing a tool exclusively of a correction for the tool radius, means for supplying a separate tool radius correction electrical signal, and means comprising a differential synchro for summing said signals, said command signal supplying means comprising a mechanical input to said synchro, said correction signal supplying means comprising an electrical input to said synchro.

11. A machine control system for a rotatable tool, said system comprising elements respectively movable along orthogonal axes, and space quadrature machine drives respectively for said elements, the angle $\theta$ representing the angle made by one of said axes and the common tangent to the cutter and workpiece at the point of instantaneous cut, a feed rate supply, means providing co-function feed rate drives in the relation of sin $\theta$ and cos $\theta$ integrated with the feed rate of said supply, means providing a shaft drive having an output representative of said angle $\theta$, means for resolving said shaft drive into co-function electrical signals and means for operating said space quadrature machine drives by the combined effect of one of said feed rate drives and the corresponding one of said electrical signals.

12. A machine control system according to claim 11, said "means for resolving said shaft drive into co-function electrical signals" including means for resolving said shaft drive into co-function electrical signals in a plurality of grades of increments, said operating means including a differential resolver transmitter for each axis, each transmitter having an electrical signal output in a plurality of grades of increments and having a mechanical input of one of said feed rate drives and an electrical input of the plurality of grades of increments of one of said co-function electrical signals, each of said space quadrature drives comprising a servo motor, each of said servo motors having a control comprising a plurality of grades of receivers controlled by the said output from the corresponding one of said transmitters.

13. A control system for a machine tool, said system comprising a pair of feed rate drives, space quadrature machine drives, means for controlling the speed ratio of said machine drives by said feed rate drives respectively, said controlling means comprising a control drive related to said feed rate drive, means for resolving said control drive into co-function electrical signals, separate means for deriving a control signal from the summation of each of said feed rate drives and one of said first mentioned signals, a servo motor for each of said machine drives and means for controlling each of said servo motors by one of said control signals.

14. A control system for a machine tool, said system comprising a pair of feed rate drives, space quadrature machine drives, means for controlling the speed ratio of said machine drives by said feed rate drives respectively, said controlling means comprising a control drive related to said feed rate drive, means for resolving said control drive into co-function electrical signals, a pair of differential resolvers each having an input of one of said feed rate drives and an input of one of said electrical signals, each of said resolvers having a signal output representing the summation of its said inputs and a servo motor for each of said machine drives controlled by one of said signal outputs.

15. A machine control system for a rotatable tool, said system comprising two machine elements on mutually perpendicular X and Y axes, means providing an input signal representative of a value proportional to the continuously varying slope angle $\theta$ between one of said axes and the tangent to the surface of a workpiece to be machined by said tool, said input signal being representative of data of a curved locus having continuous change of slope exclusive of tool radius data, means for resolving said signal representative of the value of $\theta$ into controls proportional to sin $\theta$ and cos $\theta$, means for controlling the speed of said machine elements in accordance with said controls, means providing a separate input signal representative of a value proportional to the magnitude of a linear value R, means for resolving said signals of values of R and $\theta$ into increments of said speed controls respectively, and means for modifying each of said speed controls in accordance with its said increment.

16. A machine control system for a rotatable tool, said system comprising two machine elements on mutually perpendicular X and Y axes, means providing an input signal representative of a value proportional to the slope angle $\theta$ between one of said axes and the tangent to the surface of a workpiece to be machined by said tool, means providing another input signal proportional to the magnitude of a linear value R, means for computing electrical signals which are representative of functions of $R \sin \theta$ and $R \cos \theta$, a feed rate supply, separate means for computing electrical signals which are representative of functions of the integral of feed rate multiplied by sin $\theta$ and feed rate multiplied by cos $\theta$, means for controlling the position of one of said machine elements in accordance with signals representative of the sum of said electrical signals representative of $R \sin \theta$ and the signals representative of the integral of feed rate multiplied by cos $\theta$, and means for controlling the position of the other of said machine elements in accordance with the difference of said electrical signals representative of $R \cos \theta$ and signals representative of the integral of feed rate multiplied by sin $\theta$.

17. In a machine tool, a control apparatus for a rotatable cutter having a radius, said control apparatus including means for producing coordinate data exclusive of a setting for the axis or center of said cutter, said data being proportional to the coordinates of the desired shape of a curved surface of a workpiece including data of continuous change of slope angle of said surface, said coordinates and the slope angle of said surface pertaining to orthogonal axes of reference, means for translating said co-ordinate data into electrical co-function signals proportional to the shape of a curved surface of a workpiece, means for producing correction data of the setting of the cutter axis or center as increments of said co-function signals each being a function of a continuous change of said slope angle, means for translating said correction data into increments of said co-function signals respectively, and means for algebraically summing each of said co-function signals and their respective said increments.

18. A control mechanism suitable for automatic machine tools, comprising means for reading a record, means responsive to said record-reading means for deriving control signals representing continuously varying values of slope and positions along orthogonal axes, said control signals defining a first locus with reference to said axes, means responsive to said slope signal for setting up a compensating signal, means responsive to said compensating signal for modifying said control signals to obtain modified control signals defining a second locus being the locus of the center of a circle rolling on said first locus and having a radius represented by said compensating signal, wherein said means for deriving control signals comprises means for setting up signal representations along one axis of one co-ordinate of a series of points along said first locus and means for setting up other signal representations along another axis of another co-ordinate of said points, and said means for modifying said control signals comprises means for deriving, from said slope representing signals, other signals representing the normal to said first locus at said points, means for resolving said normal representative signal into component signals along said axes and having a magnitude represented by said compensating signal, to derive representations of the components of said normal in the direction of said axes, each of said axes having means for adding said component signal representations to said co-ordinate signal representations for its axis to derive said modified control signals, said resolving means comprising a means for injecting a signal representing an angle into a resolver, and means for deriving signals proportional to the sine and cosine of said angle from said resolver.

19. A control mechanism according to claim 18, said adding means for each axis each comprising means for producing sine and cosine signal values proportional to its said inputs of component signal representations and co-ordinate signal representations.

20. A control mechanism according to claim 18, said adding means for each axis each including a plurality of grades of adding means of different sensitivities each comprising means for producing sine and cosine signal values proportional to its respective said inputs of component signal representations and co-ordinate signal representations.

References Cited in the file of this patent

UNITED STATES PATENTS

| | | |
|---|---|---|
| 2,382,994 | Holden | Aug. 21, 1945 |
| 2,385,334 | Davey | Sept. 25, 1945 |
| 2,628,539 | Neegaard | Feb. 17, 1953 |
| 2,704,012 | Trinkle | Mar. 15, 1955 |
| 2,736,852 | Nelson | Feb. 28, 1956 |
| 2,741,732 | Cunningham | Apr. 10, 1956 |
| 2,758,515 | Smith | Aug. 14, 1956 |
| 2,820,187 | Parsons et al. | Jan. 14, 1958 |
| 2,833,941 | Rosenberg et al. | May 6, 1958 |
| 2,843,811 | Tripp | July 15, 1958 |
| 2,917,693 | Cail | Dec. 15, 1959 |

FOREIGN PATENTS

| | | |
|---|---|---|
| 1,114,501 | France | Dec. 19, 1955 |